US006455094B1

(12) United States Patent
Ball et al.

(10) Patent No.: US 6,455,094 B1
(45) Date of Patent: Sep. 24, 2002

(54) TREATMENT OF FOOD PRODUCTS USING HUMIDITY CONTROLLED AIR

(75) Inventors: Hershell R. Ball, Waconia, MN (US); Fabien De Meester, Marche-en-Famenne (BE); James D. Schuman, Carver, MN (US)

(73) Assignees: Michael Foods, Inc., Minneapolis, MN (US); Belovo S.A. (BE)

( * ) Notice: Subject to any disclaimer, the term of this patent is extended or adjusted under 35 U.S.C. 154(b) by 0 days.

(21) Appl. No.: 09/483,489

(22) Filed: Jan. 14, 2000

Related U.S. Application Data

(60) Provisional application No. 60/116,117, filed on Jan. 15, 1999.

(51) Int. Cl.[7] .............................. A23L 1/32; A23B 5/005
(52) U.S. Cl. .................... 426/614; 426/330.1; 426/521; 426/298; 426/300
(58) Field of Search ................................ 426/614, 300, 426/521, 330.1, 298

(56) References Cited

U.S. PATENT DOCUMENTS

| | | | |
|---|---|---|---|
| 1,092,897 A | 4/1914 | Clairemont | .................. 426/300 |
| 2,423,233 A | 7/1947 | Funk | |
| 2,497,817 A | 2/1950 | Hale et al. | |
| 2,500,396 A | 3/1950 | Barker | |
| 2,550,189 A | 4/1951 | Droege et al. | |
| 2,576,236 A | 11/1951 | Paden | |
| 2,618,216 A | 11/1952 | Mulvany | |
| 2,673,160 A | 3/1954 | Feeney et al. | ............... 426/298 |
| 2,725,062 A | 11/1955 | Vile | |
| 2,936,240 A | 5/1960 | Kaufman et al. | |
| 3,041,212 A | 6/1962 | Booth | |
| 3,144,342 A | 8/1964 | Collier et al. | |
| 3,211,659 A | 10/1965 | Pikaar | |
| 3,561,980 A | 2/1971 | Sourby et al. | |
| 3,830,945 A | 8/1974 | Scharfman | |
| 4,562,790 A | 1/1986 | Leffke | |
| 5,283,072 A | 2/1994 | Cox et al. | .................... 426/312 |
| 5,431,939 A | 7/1995 | Cox et al. | |
| 5,589,211 A | 12/1996 | Cox et al. | .................. 426/614 |
| 5,609,095 A | 3/1997 | Lemke et al. | ................. 99/468 |
| 5,700,504 A | 12/1997 | Hale, Jr. | ...................... 426/240 |
| 5,843,505 A | 12/1998 | Davidson | .................... 426/298 |
| 5,939,118 A | 8/1999 | Cox et al. | .................... 426/298 |
| 5,960,703 A | 10/1999 | Jara et al. | ..................... 99/331 |
| 6,004,603 A | 12/1999 | Vandepopuliere et al. | .. 426/298 |

FOREIGN PATENT DOCUMENTS

| | | |
|---|---|---|
| CA | 459566 | 9/1946 |
| CA | 701272 | 1/1965 |
| CA | 2177164 | 9/1999 |
| GB | 612503 | 11/1948 |
| JP | 55 001019 B | 1/1980 |
| NL | 72454 | 3/1949 |
| SU | 577 009 A | 10/1977 |
| WO | WO 88/01834 | 3/1988 |
| WO | WO 90/09109 | 8/1990 |
| WO | WO 93/03622 | 3/1993 |
| WO | WO 95/14388 | 6/1995 |
| WO | WO 95/18538 | 7/1995 |
| WO | WO 97/02751 | 1/1997 |
| WO | WO 97/07691 | 3/1997 |
| WO | WO 97/38594 | 10/1997 |

OTHER PUBLICATIONS

*At a glance*, The University of Georgia College of Agricultural and Environmental Sciences/Griffin, 9:1 2 pages, Mar. 2000.
*Egg Pasteurization Manual*, U.S.D.A. (1969).
Eggs and Egg Products, Microbial Ecology of Foods, vol. II, Food Commodities, pp. 534–635 (1980).
Heat Treating Shell Eggs: Opacity and infertility produced by thermostabilization process at 125°F. and 144°F., The U.S. Egg and Poultry Magazine, pp. 320–322 (1943).
Salmonella Enteritidis in Eggs—Just the Facts, Commercial Layers Newsletter, Poultry Science, vol. IV–CE, No. 1 (May 1988).
Shell Egg Pasteurization, Food Technology Alliance, Electric Power Research Institute, pp. 1–4 (1997).
Stabilizing Quality in Shell Eggs, Research Bulletin, No. 362 (1943).
Treating Shell Eggs to Maintain Quality, North Central Regional Publication—University of Missouri, No. 62 (1955).
Washes and Pasteurizes Eggs, Food Industries, p. 71, Mar. 1948.
Ayres et al., Destruction of Salmonella in Egg Albumen, Journal Paper No. J. 1601, Iowa Agricultural Experiment Station, Project No. 970, pp. 180–183. No Date Provided.
Beard et al.; Where are we with with S.e.?, Egg Industry, Jul./Aug. 1992.
Chapman et al.; *Salmonella typhimurium* phage type 141 infections in Sheffield during 1984 and 1985; association with hens' eggs, Epidem. Inf., vol. 101, pp. 75–82 (1988).
Coghlan; Bathtime for eggies, New Scientist, No. 2134 Weekly, p. 17 (May 16, 1998).
Cotterill; Equivalent Pasteurization Temperatures to Kill Salmonellae in Liquid Egg White at Various pH Levels, Poultry Science, vol. 47, pp. 354–365 (1968).

(List continued on next page.)

*Primary Examiner*—Anthony J. Weier
(74) *Attorney, Agent, or Firm*—Myers Bigel Sibley & Sajovec

(57) ABSTRACT

The present invention provides the discovery that efficient heating of shell eggs can be achieved using convection currents of humidity controlled air. The humidity controlled air heating process described herein provides an efficient and attractive means of pre-heating and/or pasteurizing (i.e., pre-heating and holding) intact shell eggs. Also provided are pasteurized shell eggs produced by the inventive methods. As further aspects, the present invention also provides methods of cooling shell eggs as well as surface sanitizing shell eggs using humidity controlled air.

27 Claims, 31 Drawing Sheets

OTHER PUBLICATIONS

Cotterill et al.; Thermal Destruction Curves for *Salmonella oranienburg* in Egg Products, Poultry Science, vol. 52, pp. 568–577 (1973).

Coyle et al.; *Salmonella enteritidis* Phage Type 4 Infection: Association with Hens' Eggs, The Lancet, pp. 1295–1298 (Dec. 3, 1988).

Eilers; *Salmonella enteritidis* Food Processing, pp. 240–242 (May 1991).

Feeney et al.; High Temperature Treatment of Shell Eggs, Food Technology, pp. 242–245, May 1954.

Funk; Pasteurization of Shell Eggs, U. of Missouri Res. Bulletin 364:1–28 (1943).

Gast et al.; Detection and Enumeration of *Salmonella enteritidis* in Fresh and Stored Eggs Laid by Experimentally Infected Hens, Journal of Food Protection, vol. 55, No. 3, pp. 152–156 (Mar. 1992).

Gorsline et al.; Pasteurization of Liquid Whole Egg Under Commercial Conditions to Eliminate Salmonella, U.S. Dept. of Agriculture Circular No. 897, Oct. 1951.

Goresline et al.; Thermostabilization of Shell Eggs: Quality Retention in Storage, United States Department of Agriculture Circular, No. 898, (1952).

Hammack et al.; Research Note: Growth of *Salmonella enteritidis* in Grade A Eggs During Prolonged Storage, Poultry Science, vol. 72, pp. 373–377 (1993).

Hou et al.; Pasteurization of intact shell eggs, Food Microbiology 13: 93–101 (1996).

Itapu et al.; How far is commercial egg pasteurisation from reality?, World Poultry–Elsevier 15:2 39–40 (1999).

Kochevar et al.; Steam Vacuuming as a Pre–Evisceration Intervention to Decontaminate Beef Carcasses, Journal of Food Protection 60:2 107–113 (1997).

Lanoy; The Pasteurized Egg is Coming, Le Figaro, No. 16 726, p. 19 (May 25, 1998).

Lin et al.; Investigation of an Outbreak of *Salmonella enteritidis* Gastroenteritis Associated with Consumption of Eggs in a Restaurant Chain in Maryland, American Journal of Epidemiology, vol. 128, No. 4, pp. 839–844 (1988).

Nutsch et al.; Evaluation of a Steam Pasteurization Process in a Commercial Beef Processing Facility, Journal of Food Protection 60:5 485–492 (1997).

Nutsch et al.; Steam Pasteurization of Commercially Slaughtered Beef Carcasses: Evaluation of Bacterial Populations at Five Anatomical Locations, Journal of Food Protection 61:5 571–577 (1998).

Osborne et al.; Heat Resistance of Strains of Salmonella in Liquid Whole Egg, Egg Yolk, and Egg White, pp. 451–463. No Date Provided.

Phebus et al.; Comparison of Steam Pasteurization and Other Methods for Reduction of Pathogens on Surfaces of Freshly Slaughtered Beef, Journal of Food Protection 60:5 476–484 (1997).

Romanoff et al.; A Study of Preservation of Eggs by Flash Heat Treatment, Cornell University, Dec. 8, 1943.

Salton et al.; VI. The Effect of Pasteurization of Bacterial Rotting, Studies in the Preservation of Shell Eggs, pp. 205–222. No Date Provided.

Schuman et al.; Immersion heat treatments for inactivation of *Salmonella enteritidis* with intact eggs, Journal of Applied Microbiology 83:438–444 (1997).

Scott et al.; VII. The Effect of Pasteurization on the Maintenance of Physical Quality, Studies in the Preservation of Shell Eggs, pp. 205–222. No Date Provided.

Shah et al.; Thermal Resistance of Egg–Associated Epidemic Strains of *Salmonella enteritidisI*, Journal of Food Science, vol. 56, No. 2, pp. 391–393 (1991).

Stadelman; The Preservation of Quality in Shell Eggs, Egg Science & Technology, $3^{rd}$ Edition, pp. 63–73 (1986).

Stadelman et al.; Pasteurization of Eggs in the Shell, Poultry Science 75:9 1122–1125 (1996).

Stadelman; The Incredibly Functional Egg, Poultry Science 78:6 807–930 (Jun. 1999).

Suresh et al.; Evaluation of Initial and Final Target Temperatures for Pasteurization of Shell Eggs, Annual Meeting Abstracts, Poultry Science Association $86^{th}$ Annual Meeting 76:1 135 (Aug. 3–6 1997).

Swartzel; Equivalent–Point Method for Thermal Evaluation of Continuous–Flow Systems, Journal of Agricultural and Food Chemistry, vol. 34, pp. 396–401 (1986).

Van Lith et al.; Pasteurization of table eggs to eliminate Salmonellae, Arch. Geflügelk 59:2 157–160 (1995).

Vichienroj et al.; Fate of Virulent *Yersinia enterocoliticu* Strains Inoculant Refrigerated Foods, Book of Abstracts, 1997 IFT Annual Meeting, Orlando, Florida, p. 130 (Jun. 14–18, 1997).

International Search Report, PCT/US00/00900, Date Mailing: Jun. 13, 2000.

Salmonella entertidis H3353

FIG. 7 Salmonella heidelberg UN-L

Salmonella typhimurium DT104

Inshell survivor curve

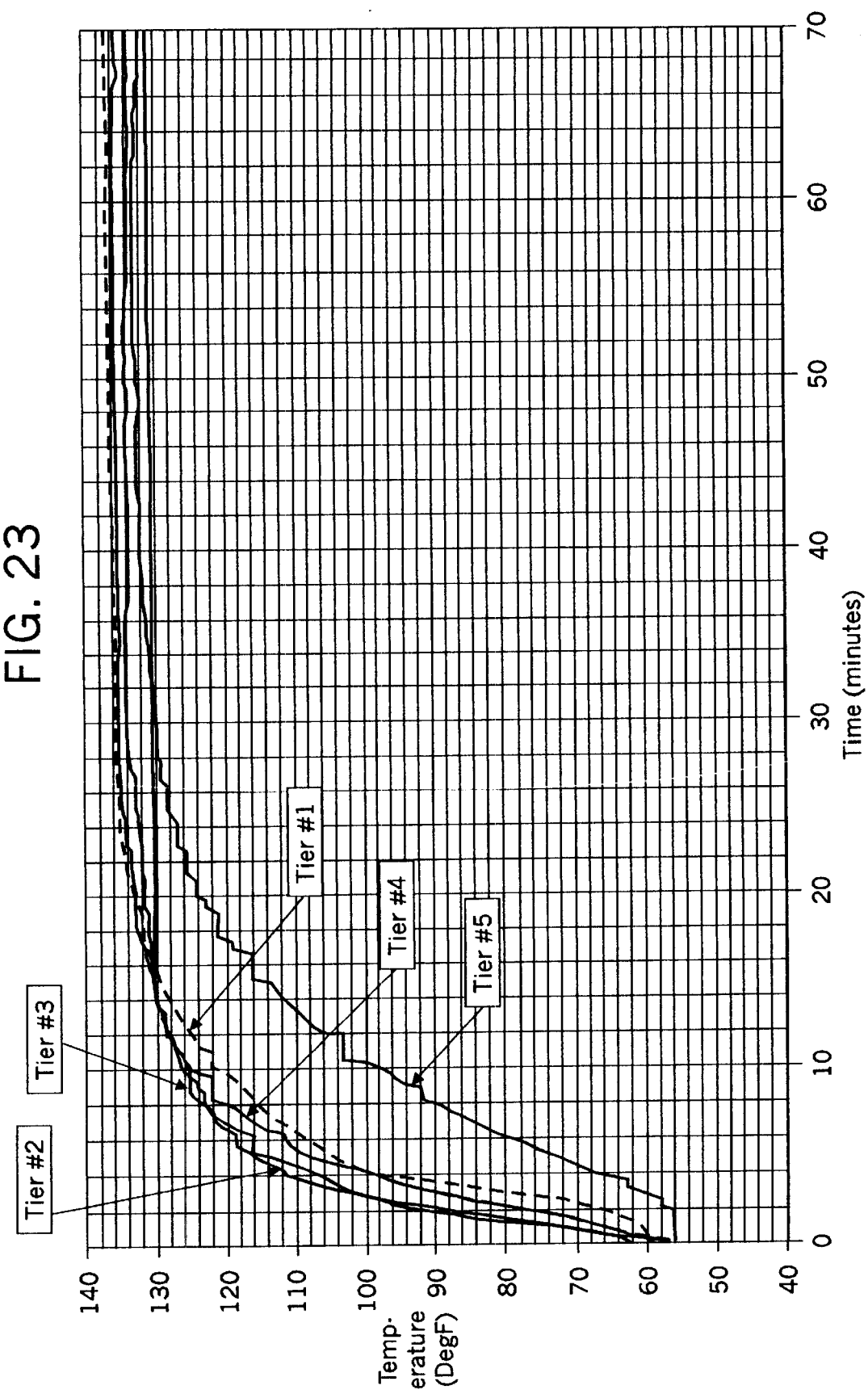

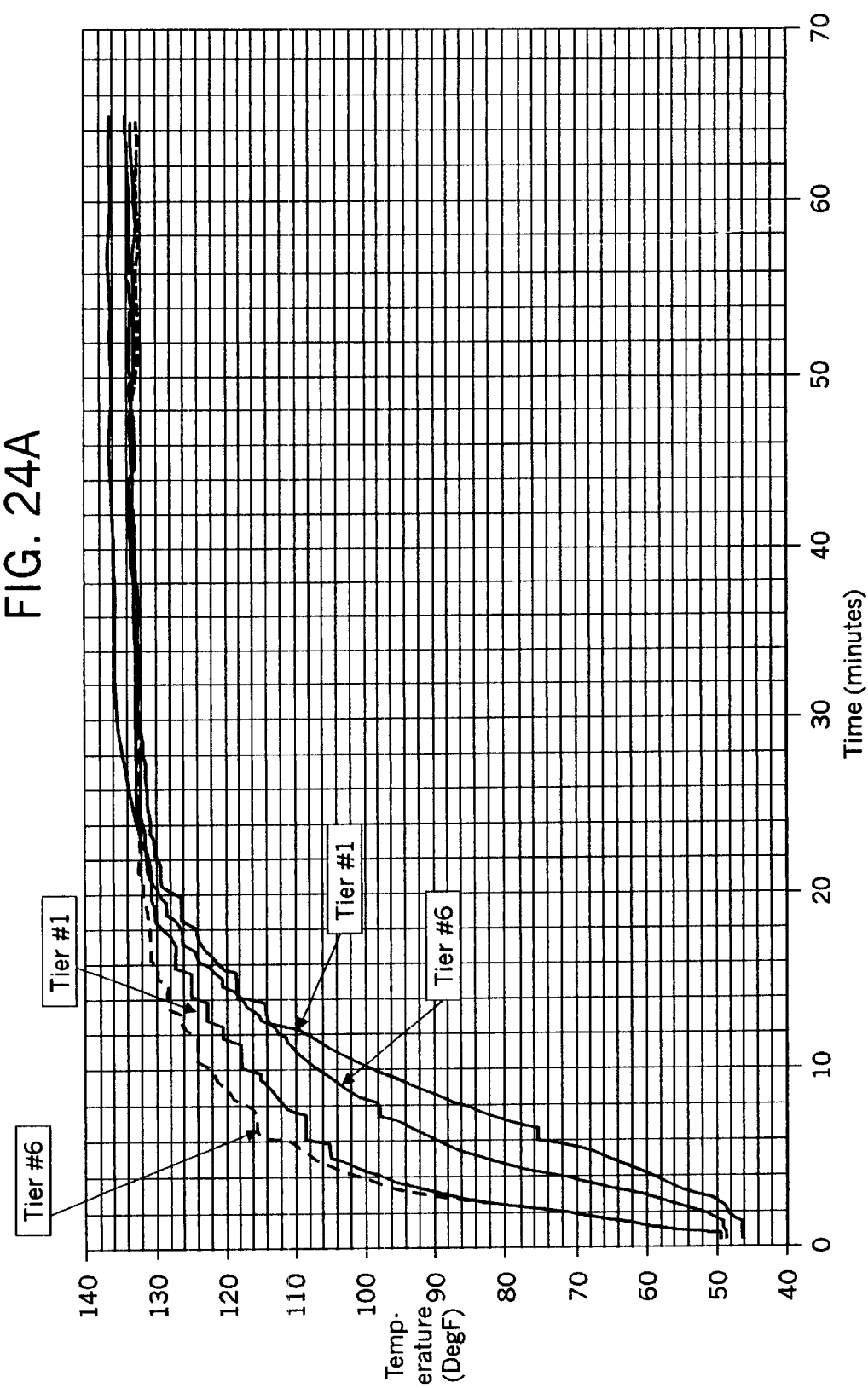

TREATMENT OF FOOD PRODUCTS USING HUMIDITY CONTROLLED AIR

RELATED APPLICATION INFORMATION

This application claims the benefit of U.S. Provisional Application No. 60/116,117 filed Jan. 15, 1999, which is incorporated by reference herein in its entirety.

FIELD OF THE INVENTION

The present invention relates to methods of treating food products, more particularly, methods of heat-treating food products.

BACKGROUND OF THE INVENTION

Contamination of shell eggs and egg products with Salmonella is a major public health concern. It is believed that Salmonella infection of shell eggs occurs either by transovarian transmission to the developing follicles or by trans-shell contamination from environmental sources (R. G. Board et al., (1996) *J. Applied Bacteriology* 29:319). Until recently, however, no effective and commercially-feasible methods for reducing or eliminating Salmonella in shell eggs have been available.

The greatest food safety challenge facing the shell egg industry is the now clearly established linkage between the consumption of undercooked shell eggs and outbreaks of salmonellosis caused by *Salmonella enterica* serovar Enteritidis (SE). This serovar first emerged as a public health challenge in Europe in the 1920s, where SE foodborne illnesses were frequently traced to the consumption of duck eggs (Tauxe, (1999) Salmonella Enteritidis: the continuing global public health challenge. In Saeed, A. M. (ed.) *Salmonella enterica* serovar Enteritidis in Humans and Animals: Epidemiology, Pathogenesis, and Control. Iowa State Univ. Press (Ames, IA)). In the United States, highly invasive strains of SE began to establish themselves within flocks of egg-laying chickens in the Northeast in the late 1970s. SE may contaminate the internal contents of the egg via a transovarian transmission route or, under certain conditions, by passage through the shell exterior. The first large, United States multi-state SE outbreak linked to shell eggs occurred in 1986. In 1988, St. Louis et al. published a breakthrough epidemiological review paper that documented that SE was much more likely to be associated with egg-containing foods than were other serovars, that the eggs involved were nearly always U.S. grade-A commercial shell eggs, that the eggs were sourced from many different flocks, and that they were typically not fully cooked (St. Louis et al., (1988) *J. Amer. Med. Assoc.* 259:2103). In the ensuing years, this problem has grown to the extent that outbreaks of egg-associated SE illness have been documented throughout the United States and in many other regions of the world, causing what the Centers for Disease Control and Prevention has characterized as a "growing worldwide pandemic" (Tauxe; supra). SE is also now the serovar most frequently isolated from patients with salmonellosis in the U.S. and in many nations around the world.

Since 1990, the U.S. Food and Drug Administration has designated grade A shell eggs as a "potentially hazardous food," due to their proven linkage to outbreaks of SE foodborne illness (FDA, (1990) Potentially hazardous Food—shell eggs. *Retail Food Protection Program Information Manual*. FDA, Center for food Safety and Applied Nutrition. Washington, DC: U.S. Government Printing Office). SE has emerged as a significant public health concern for several reasons. First has been the emergence, for unknown reasons, of multiple strains and phage types of SE capable of infecting the reproductive tissues of egg-laying hens, without causing morbidity to the host, and without reducing egg production rates. Second is the fact that commercial egg handling practices have changed very little over the last 40 years. Inconsistent and poorly controlled egg handling, shelf-life dating, and transport practices permit eggs stored for extended periods of time at varying temperatures to be marketed to the consumer. In Europe, eggs are typically distributed and marketed at ambient temperatures. Eggs handled in this manner may contain elevated levels of SE bacteria relative to fresh eggs stored under refrigeration throughout their shelf-life. Third is the now well-established fact that many traditional egg cooking procedures are inadequate to assure the inactivation of SE in eggs and egg-containing foods (Saeed and Koons, (1993) *J. Food Protect* 56:927). As a result of these concerns, the 1997 edition of the Food Code strongly recommends the use of pasteurized eggs and/or egg products in higher-risk recipes, and whenever highly susceptible populations (preschool children, the elderly, the immunocompromised) are served recipes prepared using eggs.

Pasteurization of shell eggs has been a challenge for the egg processing industry because of the physical structure of the intact egg and the susceptibility of egg proteins to heat denaturation. Egg proteins are sensitive to heat treatment, which may result in a loss of egg functionality (e.g., impairment in egg quality and properties), protein coagulation, or even partial cooking of the egg. The albumen proteins are particularly susceptible to heat damage (R. P. Elliott et al., (1980) Eggs and egg products. In *Microbial Ecology of Foods*, Vol. II, *Food Commodities*. International Commission on Microbiological Specifications for Foods. pp. 521–566. New York: Academic Press).

Typical pasteurization methods employ hot aqueous solutions, hot oil, or hot dry air to apply heat to the outside of the shell egg, such that the heat is then transmitted to the inner contents of the egg. Thus, there is a lag in the heating of the inner layers of the egg as compared with the outer layers. Accordingly, to impart a sufficient thermal treatment (i.e., time and temperature) to the center of the yolk to achieve Salmonella kill the albumen must be subjected to a greater total thermal treatment than the yolk. It therefore requires careful optimization of processing conditions to achieve a sufficient level of Salmonella kill throughout the egg without impairing egg quality and functionality, in particular, the quality and functionality of the albumen.

In recent years, several research groups have attempted to develop methods to pasteurize the internal contents of shell eggs without significantly changing the appearance, color, texture, aroma or flavor of the eggs. It has been demonstrated that immersion heat treatments in hot aqueous solutions can be used to produce high-quality Salmonella-free shell eggs (J. D. Schuman et al., (1997) *J. Applied Microbiology* 83:438; PCT Publication No. WO 95/18538 to Vandepopuliere). These investigations identified time-temperature relationships necessary to inactivate Salmonella spp. within intact shell eggs, while preserving—to the greatest extent possible—the appearance, flavor and cooking performance of unheated eggs. However, pasteurization methods employing liquid immersion or spray-washing of shell eggs are not permitted under certain regulatory schemes (for example, many European countries), thus creating a need for alternative methods of pasteurizing shell eggs.

Another research group has published the results of experiments designed to inactivate *Salmonella enteritidis* in intact shell eggs by (1) immersion in a pre-heated 57° C. (134.6° F.) water bath for up to 25 minutes, (2) placement of eggs in a pre-heated 55° C. (131° F.) dry hot-air oven with a forced air circulating fan for up to 180 minutes, or (3) use of a combination of methods (1) and (2), i.e., water-bath heating at 57° C. (134.6° F.) for 25 minutes followed by hot-air heating at 55° C. (131° F.) for 60 minutes (H. Hou et al., (1996) *Food Microbiology* 13:93). This group concluded that the combination method of heating in hot water followed by dry heated air (method (3) above) was the most commercially-feasible approach to pasteurizing shell eggs. PCT Patent Publication WO 97/02751 to Singh et al. (assigned to Purdue University) relates to this work and describes a method of heating intact eggs using a liquid or gas, or a combination of the two. A bulletin published by the Electric Power Research Institute ("Shell Egg Pasteurization", Food Technology Alliance, 1997) describes the work by Hou and coworkers at Purdue using hot air to heat shell eggs.

The work of Hou et al., (1996) *Food Microbiology* 13:93 (described above) demonstrates problems associated with heating shell eggs in a hot dry air oven. The poor heat transfer to the eggs in a hot dry air process results in a protracted time to reach pasteurization temperatures (i.e., over an hour) and to achieve Salmonella kill (i.e., 3 hours). Such extended heating times are undesirable from a commercial processing standpoint. In addition, this method may also be objectionable with respect to sanitation, as subjecting eggs to elevated temperatures below the kill temperatures for pathogenic microorganisms may actually promote microbial growth. Moreover, a prolonged hot-air heating process can produce drying and coagulation of the outer and inner-shell membranes and the outer-most layers of the albumen, resulting in the formation of an objectionable hardened and dried layer adjacent to the shell.

It has been reported that Pasteurized Eggs (Laconia, N.H.) has developed a process for heating eggs that involves a series of water baths heated to between 62° C. (143.6° F.) and 72° C. (161.6° F.) (A. Coghlan, (1998) *New Scientist*, 2134:17; see also "L'Oeuf Pasteurise Arrive", *Le Figaro*, May 25, 1998, page 19). The specific temperatures of the water baths and the residing times for the eggs in each bath are not disclosed. A final cold water bath is used to chill the eggs to refrigeration temperature. This report further notes that the Pasteurized Eggs method cannot be commercially practiced in Europe, where it is forbidden to wash eggs intended for human consumption (i.e, immerse in a water bath or spray-wash with water).

There is a need in the art for effective and efficient methods of reducing or eliminating Salmonella in shell eggs by means other than immersion in aqueous solutions. As described above, however, methods employing hot-dry air are undesirable because of the prolonged heating times required and the potentially deleterious effects on egg quality and appearance (Reviews of the art are provided, for example, by H. Hou et al., (1996) *Food Microbiology* 13:93, and W. J. Stadelman et al., (1996) *Poultry Science* 75:1067).

U.S. Pat. No. 5,843,505 to Davidson describes a method of heating shell eggs to reduce Salmonella contamination therein. This method employs a "fluid heat transfer medium", which can be a gas, but is preferably an aqueous medium. Although this publication makes reference to the use of "water vapor" to heat shell eggs (Col. 6, lines 25–26), it fails to provide the specifications for providing a commercially-feasible process for achieving a balance between Salmonella kill and preservation of egg functionality and appearance.

U.S. Pat. No. 5,700,504 to Hale describes a method of heating shell eggs prior to pasteurization by irradiation to prevent the deterioration in egg quality normally associated with irradiation (due to thinning of the albumen following irradiation). Hale provides that intact eggs can be heated by any suitable method, including "hot water baths, steam, radio waves, microwaves, and ohmic heating methods." (Col. 2, lines 50–55). The method of Hale, however, is primarily intended as a pre-treatment thermostabilization process and not as a pasteurization process.

Since 1996, M. G. Waldbaum Company (Minneapolis, Minn.), a subsidiary of Michael Foods Inc., has produced and marketed in-shell pasteurized eggs for the retail and foodservice markets. These eggs are pasteurized using a thermal treatment process involving liquid immersion. As described above, liquid immersion of shell eggs is prohibited under some regulatory schemes.

Accordingly, there remains a need in the art for alternative and improved methods of reducing or eliminating Salmonella spp. in shell eggs.

SUMMARY OF THE INVENTION

It is an object of the present invention to provide for the heat treatment of shell eggs without utilizing liquid immersion or spray washing.

It is a further object of the invention to provide an effective method of pasteurizing shell eggs.

It is still a further object of the invention to provide methods of pre-treating shell eggs to bring them to pasteurization temperature using humidity controlled air.

It is yet a further object of the invention to provide a method of cooling shell eggs without liquid immersion or spray washing.

It is another object of the invention to provide a method of sanitizing the surface of a shell egg in the absence of liquid immersion or spray washing.

It is still a further object of the invention to reduce Salmonella spp. (e.g., *Salmonella enteritidis*) within shell eggs without substantially or significantly decreasing the quality or functional properties of the treated egg.

It is yet another object of the invention to produce a pasteurized shell egg that retains high quality and functional properties.

These and other objects of the invention are provided by the methods and apparatus described below.

The present invention is based, in part, on the discovery that efficient heating of shell eggs may be achieved using convection currents of humidity controlled air. Surprisingly, heating profiles for shell eggs achieved with humidity controlled air according to the present invention are quite similar to those achieved by immersion heating of shell eggs in an aqueous solution (see J. D. Schuman et al., (1997) *J. Applied Microbiology* 83:438). Accordingly, the present invention provides a viable alternative for reducing or eliminating Salmonella spp. in egg processing operations, in particular, in those situations in which pasteurization of shell eggs by liquid immersion is prohibited or otherwise undesirable. The humidity controlled air heating process described herein provides an efficient and attractive means of pre-heating and/or pasteurizing (i.e., pre-heating and holding) intact eggs. As further aspects, the present invention also provides methods for cooling shell eggs as well as surface sanitizing shell eggs using humidity controlled air.

These and other aspects of the present invention are set forth in more detail in the description of the invention below.

BRIEF DESCRIPTION OF THE DRAWINGS

FIG. 23 is a graphical representation of the internal egg temperature for shell eggs heated in humidified air. The dry bulb temperature was set at 137° F. (58.3° C.) and the wet bulb temperature was set at 135° F. (57.2° C.). Air flow was 350 ft/min. Eggs were heated in six tiers.

FIG. 24A is a graphical representation of the internal egg temperature for shell eggs heated in humidified air. The dry bulb temperature was set at 137° F. (58.3° C.) and the wet bulb temperature was set at 135° F. (57.2° C.). Air flow was 350 ft/min. Eggs were heated in six tiers.

DETAILED DESCRIPTION OF THE INVENTION

Figure 1:
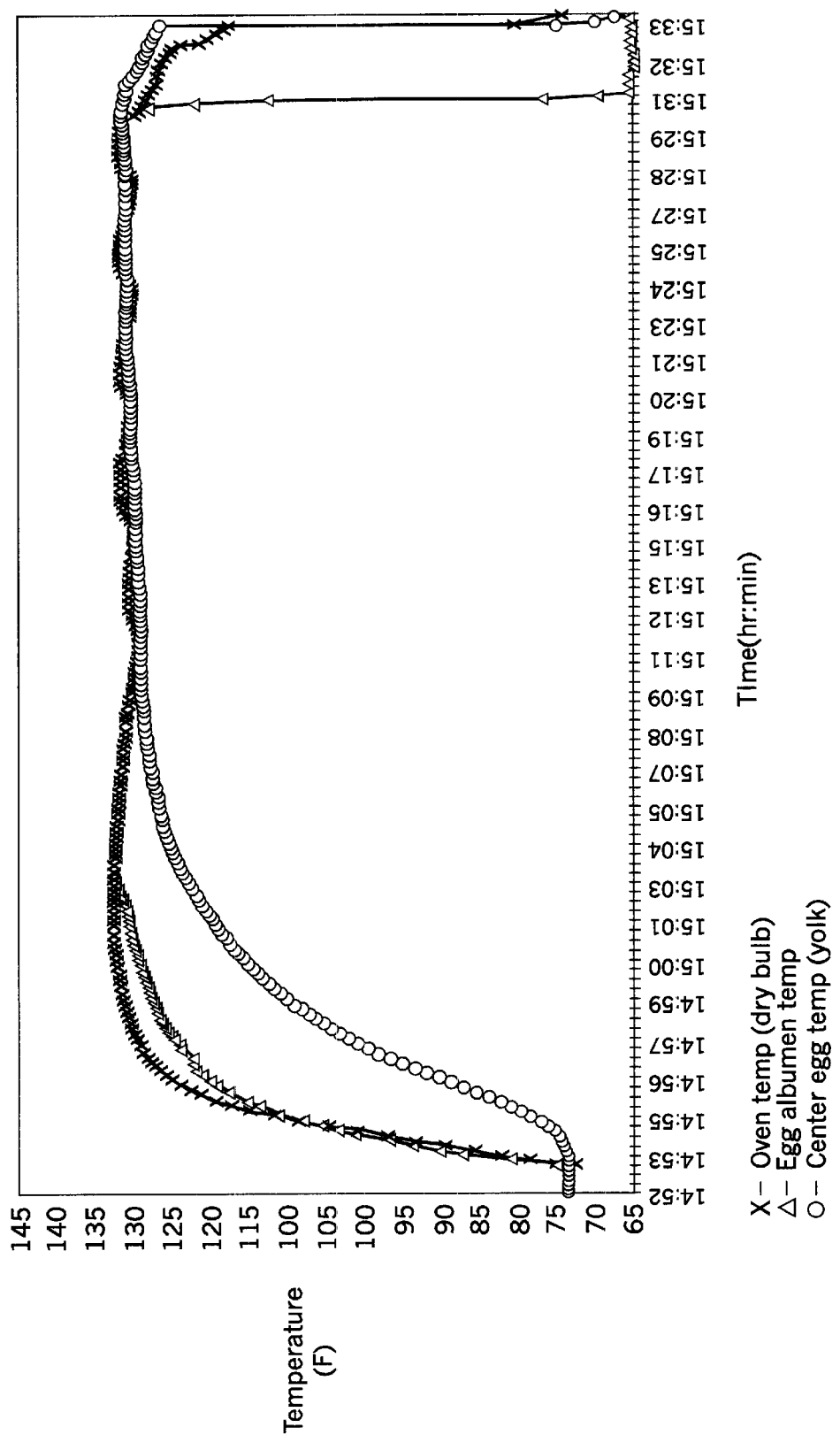
FIG. 1 shows the heating curves for albumen (▲) and yolk (○) of two individual shell eggs heated in a sealed oven in the presence of convection currents of air humidified at a relative humidity of >95% and circulated at a fan velocity of approximately 1600 rpm. The two eggs for which the results are shown were placed on a plastic egg flat containing a total of 30 shell eggs. The dry bulb temperature of the oven is also depicted (X). The oven was initially at the ambient temperature, and was set at 132° F. (55.6° C.) for the first 23 minutes of the study, at which time it was increased to 133° F. (56.1° C.) for the remainder of the experiment. The results represent the average of data collected from the two eggs.
Figure 2:
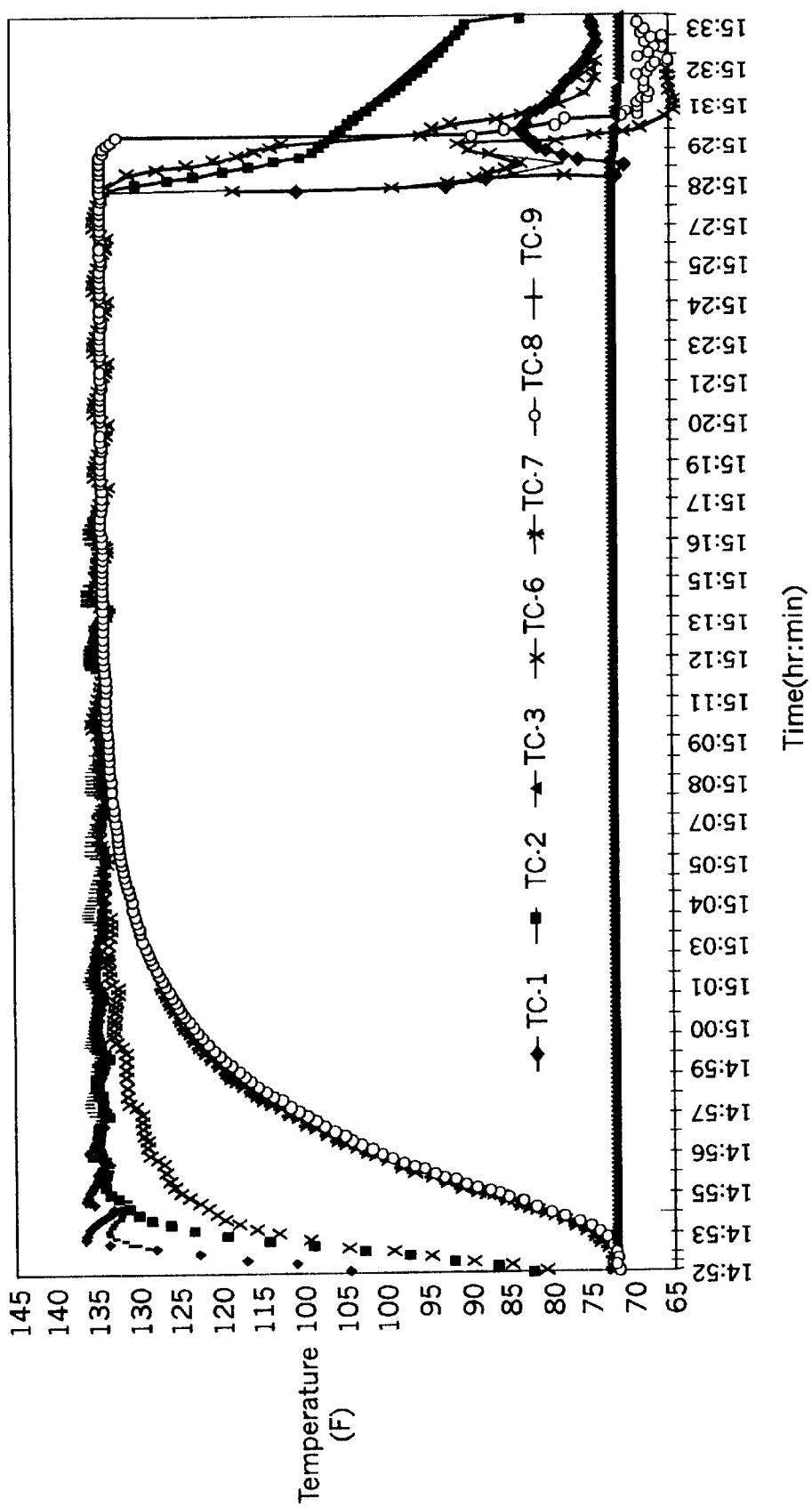
FIG. 2 shows the heating profiles for egg albumen and center egg yolk for two shells eggs in a sealed oven set at 136° F. (57.8° C.) in the presence of convection currents of air humidified at a relative humidity of >95% and circulated at a fan velocity of approximately 1600 rpm. The oven was at the ambient temperature at the beginning of the experiment. The results are the average of data collected from two eggs nested in the middle layer of three stacked plastic egg flats containing 30 eggs each. Legend: TC-1=oven temperature (dry bulb); TC-2=oven temperature (wet bulb); TC-3=ambient air temperature; TC-6=egg albumen temperature; TC-7=center egg yolk temperature of first egg monitored; TC-8=center egg yolk temperature of second egg monitored; TC-9=egg flat temperature.
Figure 3:
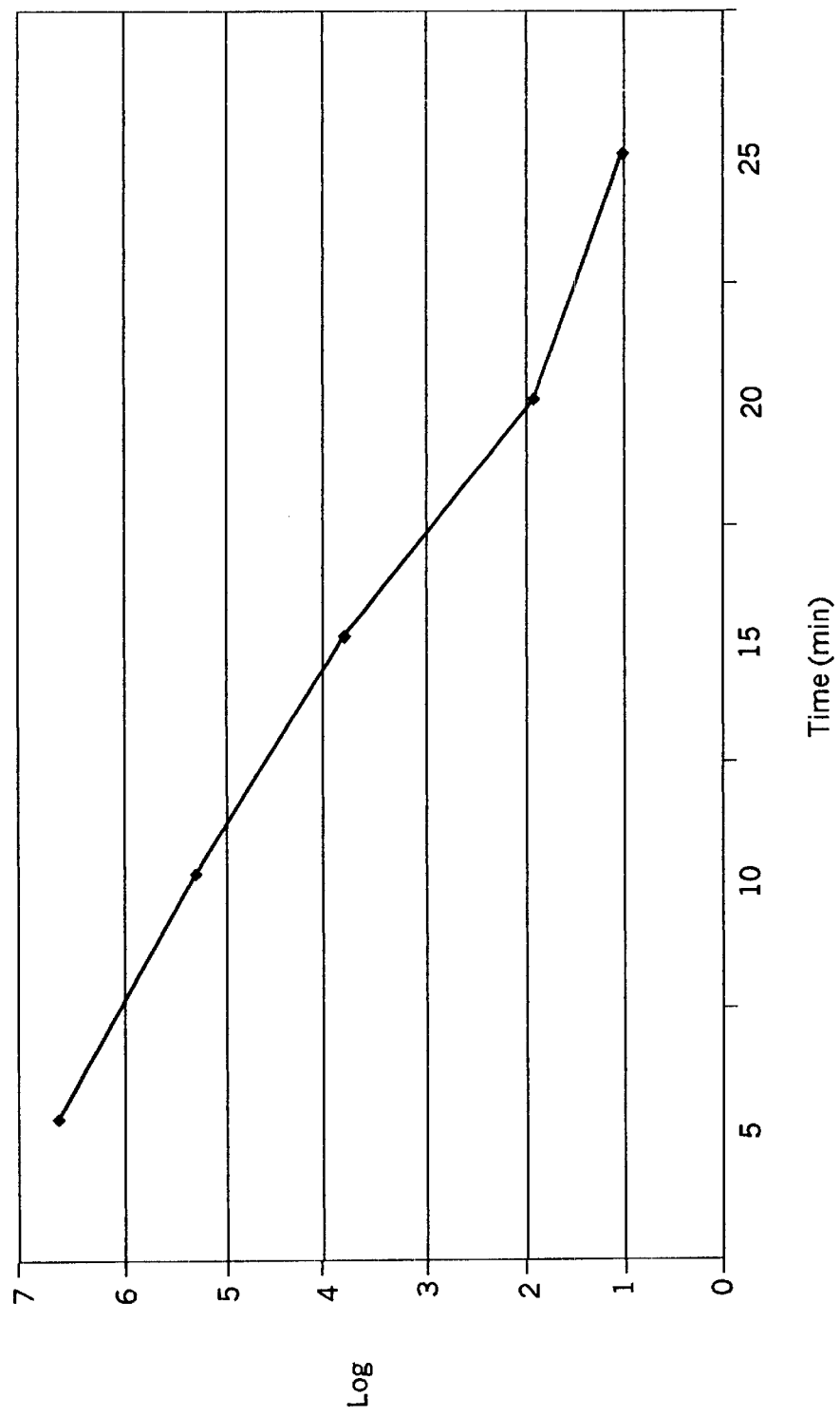
FIG. 3 is a graphical representation of surviving *Salmonella enteritidis* Benson-1 (in cfu) in inoculated LWE after heating for 5, 10, 15, 20 and 25 minutes at 56.67° C. (134° F.).
Figure 4:
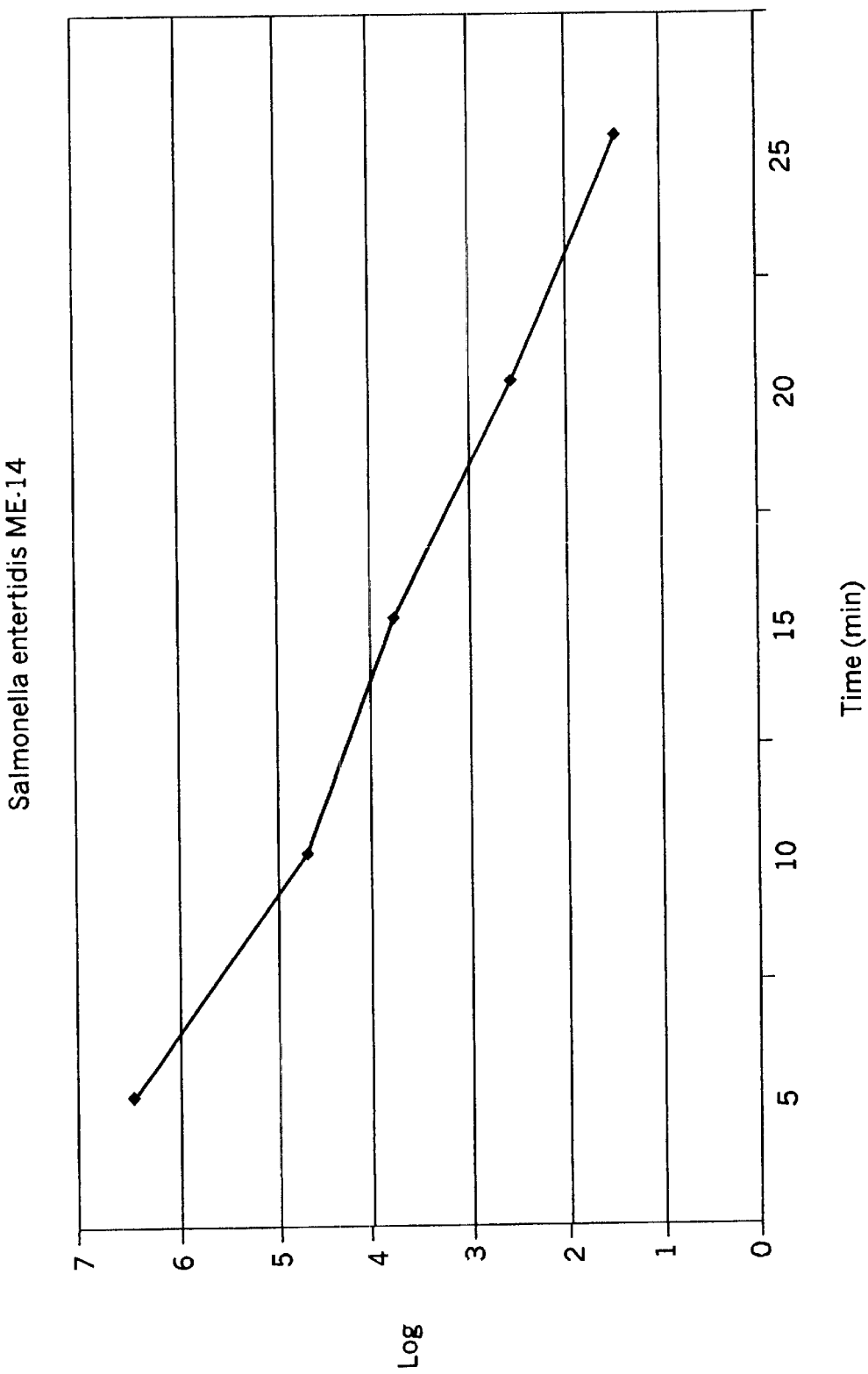
FIG. 4 is a graphical representation of surviving *Salmonella enteritidis* ME-14 (in cfu) in inoculated LWE after heating for 5, 10, 15, 20 and 25 minutes at 56.67° C. (134° F.).
Figure 5:
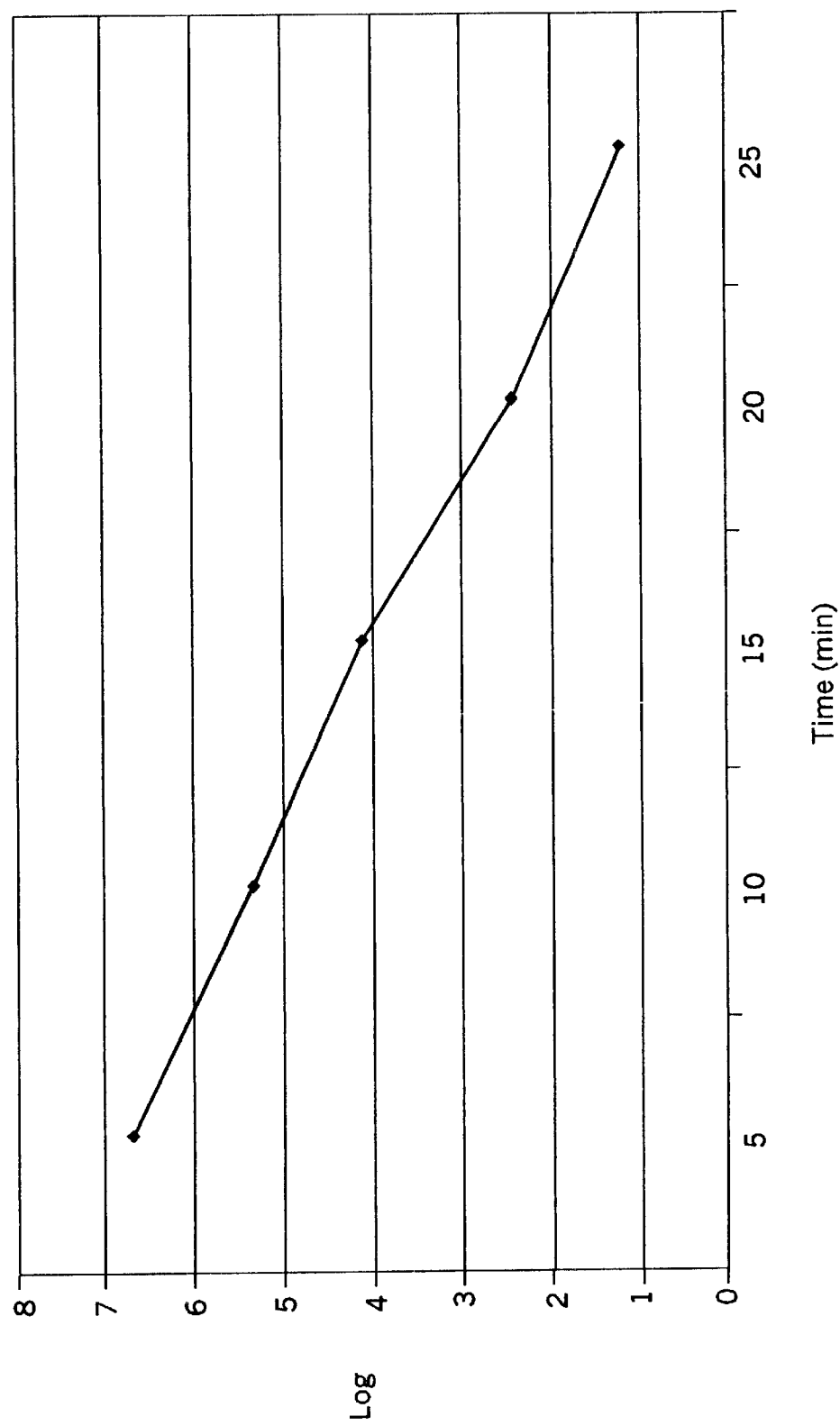
FIG. 5 is a graphical representation of surviving *Salmonella enteritidis* ME-18 (in cfu) in inoculated LWE after heating for 5, 10, 15, 20 and 25 minutes at 56.67° C. (134° F.).
Figure 6:
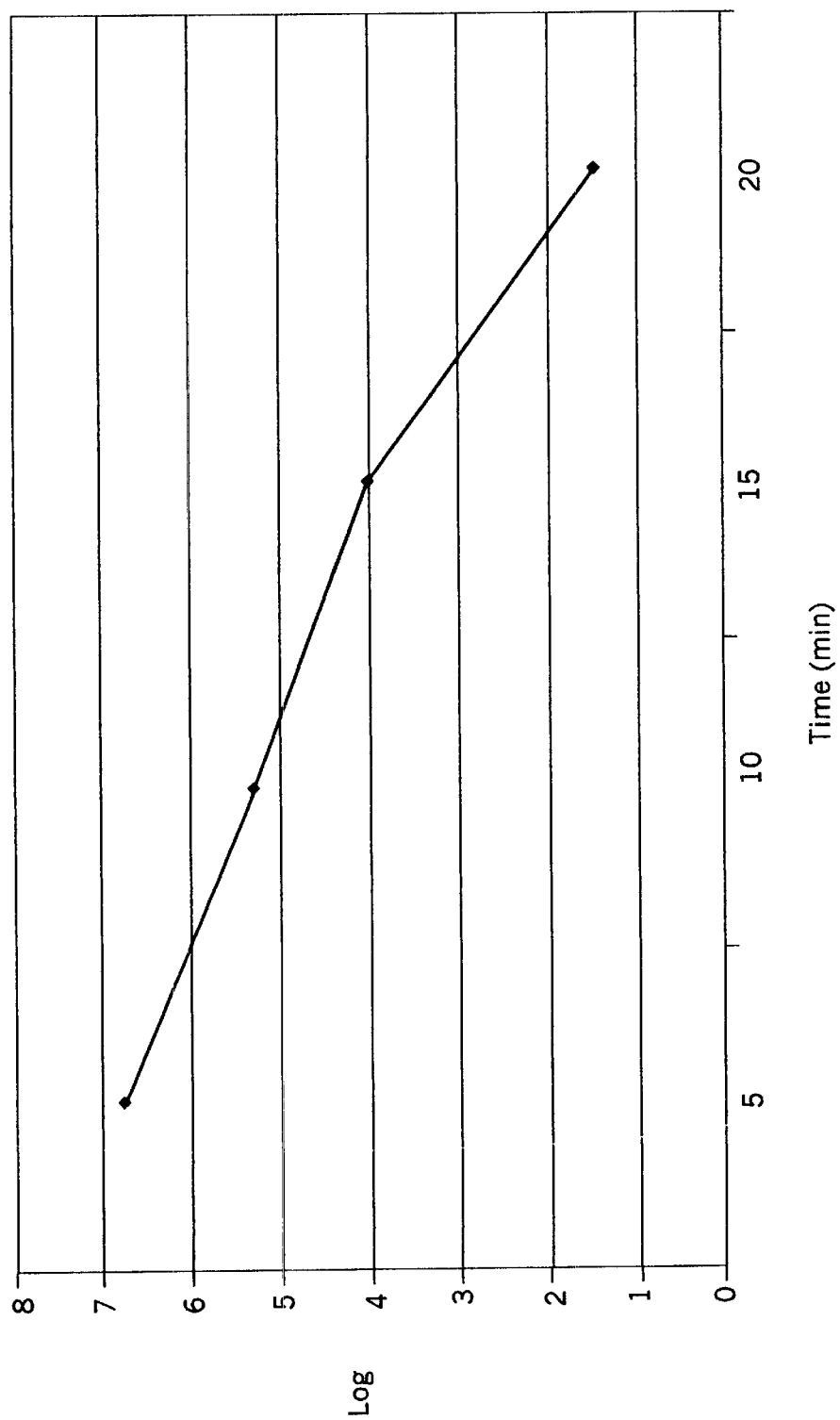
FIG. 6 is a graphical representation of surviving *Salmonella enteritidis* H3353 (in cfu) in inoculated LWE after heating for 5, 10, 15, 20 and 25 minutes at 56.67° C. (134° F.).
Figure 7:
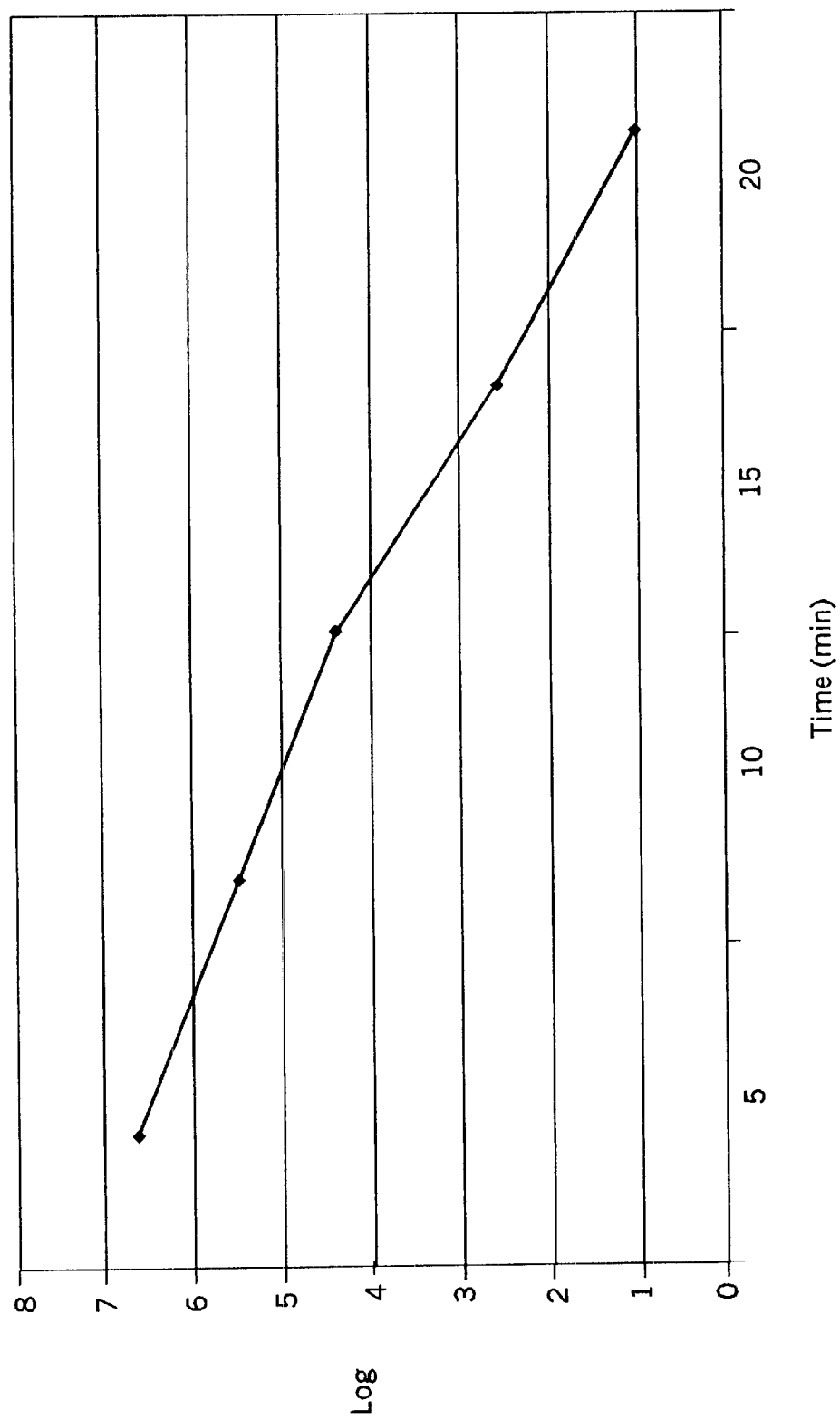
FIG. 7 is a graphical representation of surviving *Salmonella heidelberg* UN-L (in cfu) in inoculated LWE after heating for 5, 10, 15, 20 and 25 minutes at 56.67° C. (134° F.).
Figure 8:
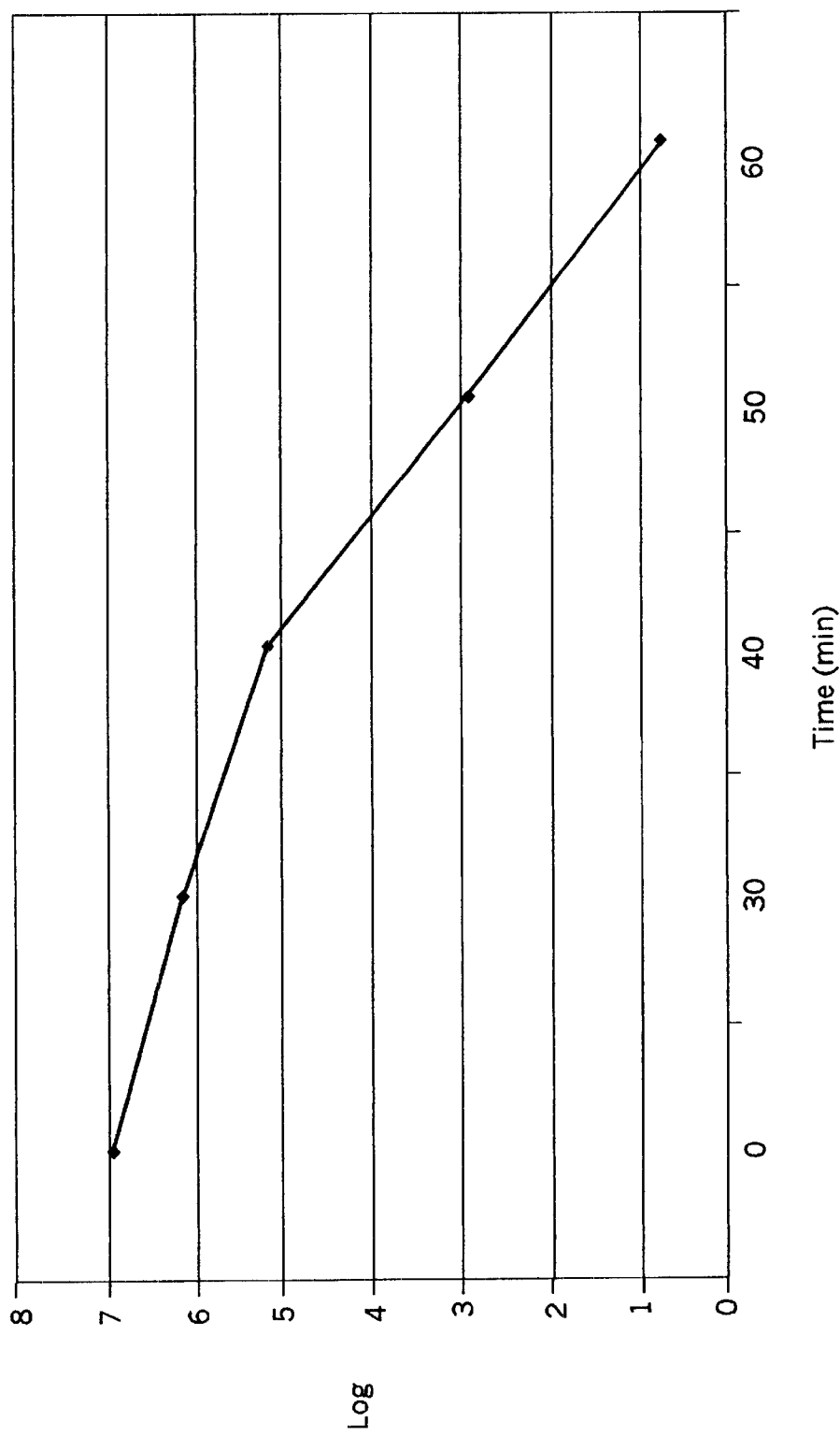
FIG. 8 is a graphical representation of surviving *Salmonella typhimurium* DT104 (in cfu) in inoculated LWE after heating for 5, 10, 15, 20 and 25 minutes at 56.67° C. (134° F.).

The present invention provides a method of efficiently and uniformly heating shell eggs using humidity controlled warm air. In particular embodiments, the impingement of the eggshells with currents of moist warm air results in more efficient heat transfer to the internal contents of the shell egg (FIGS. 1 and 2). The inventive methods also provide an effective means to maintain target egg internal temperatures within a narrow range. The invention is further useful for heat-sanitizing the surface of and/or pasteurizing the internal contents of shell eggs in situations where immersion of eggs in an aqueous solution is either undesirable or restricted under current egg processing regulations.

Heat pasteurization of shell eggs to destroy Salmonella is a two-stage process. The initial phase is a "pre-heating" or "come-up" period in which the internal contents of the shell egg are heated to a target temperature (e.g., 1 32.8° F. or 56° C.) to effect Salmonella kill. The second phase begins once the egg contents have achieved the target temperature, and is marked by a logarithmic reduction in Salmonella levels in the egg. As discussed hereinabove, the lag in heat transfer through the shell and to the center of the egg results in the various layers of the egg entering the second phase (i.e., logarithmic Salmonella kill) at different times after the onset of the thermal treatment.

In one embodiment of the invention, a method is provided for pasteurizing a shell egg in which the shell egg is heated with humidity controlled air (preferably, currents of humidity controlled air) for time(s) and temperature(s) sufficient to bring the contents of the shell egg to a target temperature for the destruction of Salmonella spp. The eggs are typically exposed to the humidity controlled air within a sealed chamber (e.g., an oven) or tunnel. After pre-heating the eggs to a pasteurization temperature using humidity controlled air (preferably, currents of humidity controlled air), egg internal temperatures may be maintained or "held" for periods of time in order to achieve various target pasteurization criteria (e.g., F-values or numbers of log cycles of microbial inactivation) by any means known in the art. The temperature of the shell eggs may be maintained during the holding/pasteurization period with humidity controlled air (preferably, currents of humidity controlled air). Alternatively, the egg temperatures may be maintained by any other method known in the art, for example, by transfer of the eggs to a vessel containing a pre-heated liquid (e.g., aqueous or oil), or by transfer to a pre-heated chamber or tunnel containing essentially hot-dry (i.e., ambient relative humidity) air. In preferred embodiments, the shell eggs are not immersed in an aqueous solution during the come up and/or the holding periods.

As a further alternative, the shell eggs may be pre-heated by any of the methods discussed in the preceding paragraph, and then transferred to a sealed chamber or tunnel in which the temperature is maintained during the holding/pasteurization period by heated humidity controlled air (preferably, as currents of humidity controlled air).

In more preferred embodiments of the invention, the shell eggs are heated during the entire pasteurization process (i.e., pre-heating and holding) in a sealed chamber or oven by heated humidity controlled air. The pre-heating and/or holding phases may be carried out by heating the eggs at a continuous temperature, or alternatively, at variable temperatures (e.g., in a series of chambers set at different temperatures).

The present investigations were conducted using a commercial COMBITHERM® Combination Oven/Steamer (Model 7-14 G; Alto-Shaam, Inc., Menomonee Falls, Wis.), although alternative equipment designs may be used to achieve similar results. In illustrative embodiments, ovens or heating tunnels that may be infused with humidified air, preferably currents of humidified air, may be employed in practicing the present invention.

An unexpected feature of the humidity controlled air heating process of the present invention is the fact that the egg internal contents reach the target pasteurization temperature essentially as rapidly as (or even slightly faster than) eggs that are heated by immersion in a pre-heated circulating aqueous solution (J. D. Schuman et al., (1997) *J. Applied Microbiology* 83:438). Once the eggs reach the target pasteurization temperature, Salmonella destruction curves follow the same kinetics as previously described. Id.

At the end of the pasteurization process, the eggs are typically cooled by exposing the eggs to temperatures below the pasteurization "hold" temperature using refrigeration or, alternatively, by spray or currents of cooled humidity controlled air (described in more detail below). The invention can be carried out as a fully mechanized process or a fully manual process, or by a combination of manual and mechanized processes.

In particular embodiments of the invention, the shell egg is heated in humidity controlled air (e.g., for predetermined time(s) and/or at predetermined temperature(s)) to provide to the shell egg a thermal treatment sufficient to bring the interior contents of the shell egg to a pasteurization temperature for Salmonella (e.g., *S. enteritidis*) inactivation. In alternate embodiments, the shell egg is heated in humidity controlled air (e.g., for predetermined time(s) and/or at predetermined temperature(s)) so as to obtain the desired level of Salmonella (e.g., *S. enteritidis*) inactivation in the shell egg (e.g., at least about a 5-log reduction). The thermal treatment to be provided to the shell egg may be set with reference to the albumen or the yolk of the egg, more preferably the yolk, still more preferably, the center of the yolk. In other words, in more preferred embodiments, the thermal treatment is selected so as to obtain the target pasteurization temperature, or alternatively, the desired Salmonella kill, in the yolk (more preferably, the center of the yolk) of the shell egg.

Typically, in a commercial operation, the shell eggs will be heated at predetermined time(s) and at predetermined temperature(s) according to the present invention. Alternatively, the heating process may be monitored and the heating time and/or temperature may be determined during the processing run. For example, the shell eggs for each processing run may be monitored for when the internal temperature reaches a target temperature rather than relying on a predetermined time at a predetermined temperature.

In selecting the time and temperatures for carrying out the instant invention, any number of methods may be used, for example, the equivalent point method of thermal evaluation to determine the total thermal treatment at various locations within the shell egg, including the albumen and the yolk (Swartzel, (1986) *J. Agric. Food Chem.* 34:397); inoculation studies may be conducted to determine the treatment conditions which yield the desired reduction in Salmonella species; or a $F_o$ value may be determined for the shell egg which results in the desired reduction in Salmonella (I. J. Pflug et al, (1991) Principles of the thermal destruction of microorganisms, Chapter 6, In, S. S. Block (ed.) Disinfection, Sterilization and Preservation, Lea and Febiger, Philadelphia, Pa.). Alternatively, the thermal treatments may be selected so as to achieve a target temperature at particular locations within the shell egg. The target temperature may be determined based on known Salmonella destruction curves (see, e.g., J. D. Schuman et al., (1997) *J. Applied Microbiology* 83:438). The internal contents of the egg are heated to the same target temperature regardless of the size or source of the shell egg. The selected time and temperature treatments delivered to the shell egg to heat the contents thereof to the desired target temperature may be determined for shell eggs of different sizes or from different poultry species by methods known to those skilled in the art.

Suitable time and temperature treatments to inactivate Salmonella spp. in shell eggs may also be determined from kinetic data published by J. D. Schuman et al., (1997) *J. Appl. Microbiol.* 83:438. Table 1 below shows decimal reduction time values ("D values", i.e., time at a given constant center egg temperature necessary to effect a one-log reduction in the surviving Salmonella population) as well as the total pasteurization hold times (i.e., after pre-heating the egg to the target temperature) necessary to achieve a 3-, 5-, or 7-log reduction of Salmonella spp. The hold time period begins after preheating the egg contents to the target pasteurization temperature. Based on linear inactivation kinetics, the regression equation used to calculate the upper (i.e., maximum) and lower (i.e., minimum) D-value estimates listed in Table 1 is:

$$y = -0.1249x + 7.812 \qquad \text{Equation 1}$$

where x=degrees Celsius and y=log(D-value) in minutes for Salmonella spp. within the center of shell eggs.

TABLE 1

Decimal Reduction Values to achieve a 1-log Reduction in Salmonella spp. at Various Temperatures

| Pasteurization Temperature (center egg) | D-value (minutes) | 3-log cycle Inactivation (min) | 5-log cycle Inactivation (min) | 7-log cycle Inactivation (min) |
|---|---|---|---|---|
| 51.4° C. (124.5° F.) | 24.67 | 74.01 | 123.35 | 172.69 |
| 56.3° C.* (133.3° F.) | 6.0 | 18.0 | 30.0 | 42.0 |
| 59.4° C. (139° F.) | 2.47 | 7.41 | 12.35 | 17.30 |

*Experimental data.

Pasteurization times at various yolk temperatures may be readily calculated using the D-values in Table 1. For example, at an internal yolk temperature of 51.4° C., a one-log reduction in Salmonella is achieved after about 24.67 minutes, whereas a 5 log-reduction would require a holding time of about 123.35 minutes. Likewise, at an internal yolk temperature of 59.4° C., a one-log reduction in Salmonella is achieved after holding the yolk for approximately 2.47 minutes, and a five-log reduction is observed with a holding time of approximately 12.35 minutes. Those skilled in the art will appreciate that these particular time and temperature combinations are illustrative only, and may be routinely optimized by those skilled in the art for particular processing conditions. Moreover, in general, there is a range of time and temperature combinations around the empirically-derived values in Table 1 which will achieve the desired reductions in Salmonella without significant adverse effects to the functionality or appearance of the shell egg. In general, the pre-treatment time to raise the center of the yolk to the target temperature will range from about 15 to 45 minutes. Those skilled in the art will appreciate that the pre-heating time will vary with the starting temperature of the heating chamber (e.g., ambient temperature or pre-heated) and/or the shell egg (e.g., refrigerated temperature or ambient temperature), and/or the number of eggs to be heated, as well as other processing conditions known to those skilled in the art.

For illustrative purposes, the pre-heating time to get the center of the yolk of a shell egg at ambient temperature to a temperature of 132.8° F. (56° C.) or 134.6° F. (57° C.) in a pre-heated water bath or using humidity controlled air according to the present invention is approximately 20 to 30 minutes. In general, heat transfer to the egg is quite efficient using the inventive methods disclosed herein. Heat up times will be somewhat longer (e.g., 3–10 minutes) for eggs that are at temperatures less than ambient temperatures, for example, eggs that are at refrigerated temperatures or have been tempered to about 55° F. (12.8° C.) to 65° F. (18.3° C.) as is typical in the egg processing industry. It is preferred that eggs are tempered to about 55° F. (12.8° C.) to 65° F. (18.3° C.) prior to the start of the pasteurization process.

In exemplary embodiments, the present invention may be carried out by holding the yolk of the shell egg (preferably, the center of the yolk) at temperatures in the range of about 122° F. (50° C.) to 140° F. (60° C.), preferably about 126° F. to 139° F. (i.e., 52° C. to 59.4° C.), more preferably about 131° F. (55° C.) to 138.2° F. (59° C.), still more preferably about 132.8° F. (56° C.) to 136.5° F. (58° C.), yet more preferably about 132.8° F. (56° C.) to 134.6° F. (57° C.). Eggs are typically held at internal temperatures at or above about 120° C. (48.9° C.) and less than about 140° F. (60° C.). In particular embodiments, these target temperatures can be reached by exposing the shell egg to humidity controlled air at temperatures of about 123° F. to 142° F. (50.6° C. to 61.1° C.), preferably about 127° F. to 141° F. (52.8° C. to 60.6° C.), more preferably about 132° F. to 139° F. (55.6° C. to 59.4° C.), still more preferably about 133° F. to 138° F. (56.1° C. to 58.9° C.), yet more preferably about 134° F. to about 137° F. (56.7° C. to 58.3° C.). In general, the temperature of the humidity controlled air will be approximately 0.5° F. to 3° F. (0.3° C. to 1.7° C.), preferably 1° F. to 2° F. (0.6° C. to 1.1° C.), warmer than the target temperature for the center of the egg yolk.

It will be understood by those skilled in the art that the time for which the shell egg will be held at the target temperature(s) will be dependent upon the particular target temperature(s) chosen (see, e.g., Table 1), the temperature of the heating medium, and the target reduction in Salmonella. Generally, times will vary from about 12 to about 140 minutes, although prolonged holding periods are less desirable from a commercial standpoint. Preferably, the holding time is more than about 12, 15, 18, 20, 25, 30, 35, 40 minutes or more. It is also preferred that the holding time is less than about 125, 110, 90, 75, 60, 50, 45, 40, 35, 30 or 25 minutes. Exemplary holding periods for shell eggs according to the present invention are 12 to 45 minutes, more preferably about 15 to 40 minutes, still more preferably about 20 to 35 minutes, yet more preferably 25–35 minutes.

Illustrative thermal treatments according to the present invention to achieve a 5-log reduction in Salmonella spp. within the yolk of a chicken shell egg include maintaining the center of the yolk for approximately 15–35 minutes (e.g. 30 minutes) at about 132.8° F. (56° C.) to 138.2° F. (59° C.), more preferably for about 20–35 minutes at about 132.8° F. (56° C.) to 134.6° F. (57° C.). In more preferred embodiments, the shell egg is pasteurized by maintaining the center of the yolk for about 25–35 minutes (e.g., 30 minutes) at about 132.8° F. (56° C.) to 136.4° F. (58° C.).

The total processing time will vary will the parameters discussed above, and in any event, is less critical than the reduction in Salmonella kill that is achieved. In general, however, total processing time will vary from about 35 to 120 minutes, preferably about 40 to 90 minutes, more preferably about 45 to 80 minutes, yet more preferably about 50 to 75 minutes.

To ensure the desired level of Salmonella destruction, it is preferred to hold the shell eggs at the target pasteurization temperature for a period of time sufficient to achieve the target level of inactivation (e.g., a 5-log reduction), which may be determined as described above. Those skilled in the art will appreciate that there will be some Salmonella destruction during the latter part of the pre-heating phase, as the contents of the shell egg are brought to the target temperature. Typically, about a 1-log, 2-log, or even 3 log or more reduction in Salmonella may be observed during this preheating phase (see, e.g., J. D. Schuman et al. (1997) *J. Applied Microbiology* 83:438). In particular embodiments of the invention, the pasteurization process is carried out to include the Salmonella kill that occurs during the pre-heating phase in the final target for Salmonella destruction. According to this embodiment, hold and total processing times will be reduced to achieve the target Salmonella kill. Exemplary hold times for this embodiment of the invention include, but are not limited to, hold times of about 6–30 minutes, preferably about 9–25 minutes, more preferably about 12–22 minutes. Likewise, total processing times will generally be shortened to about 30–70 minutes, preferably 35–65 minutes, more preferably 40–55 minutes. To give a particular illustration, a shell egg heated to an internal temperature of about 56° C., may be held for approximately 18 minutes (see Table 1) to achieve a 3-log reduction in Salmonella species. If a two-log reduction is achieved during an approximately 25–35 minute heat up time, the total process will be about 43 to 53 minutes long and will achieve about a 5-log reduction in Salmonella kill in the egg.

It has been established that environmental conditions will affect the thermal inactivation of Salmonella. Cotterill et al., Egg Science and Technology (William J. Stadelman and Owen J. Cotterill eds., 3d ed. 1986), and the Egg Pasteurization Manual (USDA, 1969) provide data showing the influence of egg product type, pH, salt, and sugar on the thermal resistance of Salmonella spp. Moreover, when evaluating the thermal resistance of Salmonella in shell eggs, the location of the Salmonella within the egg is important. The thermal resistance of Salmonella in different egg products is as follows: plain yolk>whole egg or pH 7 egg white>pH 9 egg white (Egg Pasteurization Manual, USDA, 1969). Therefore, increased thermal treatments may be required for yolk as compared with pH 7 egg white or pH 9 egg white. Those skilled in the art will appreciate that the specific times and temperatures to practice the present invention may vary with the size, source, age, and pH of the shell egg. Determining particular thermal treatments for practicing the present invention, in view of these factors, will be routine for those skilled in the art based on the description of the invention provided herein.

The term "shell egg" as used herein refers to any poultry (i.e., avian) egg, in the shell and with the shell essentially unbroken. While any poultry shell egg may be used to carry out the present invention (including chicken, turkey, duck, goose, quail, and pheasant eggs), chicken and turkey eggs are preferred, and chicken eggs are most preferred. The present invention is preferably carried out with fresh shell eggs (e.g., eggs that are less than 12, 24, 36, 48, 72 or 96 hours old). Also preferred are embodiments wherein the eggs are approximately 12 to 24, 24–36, 24–48, 36–48, or 48–96 hours old.

Pasteurized shell eggs according to the present invention are eggs in which the albumen and yolk of the egg are essentially liquid, as opposed to "soft boiled" (i.e., an egg placed in boiling water for three minutes) or "hard boiled" (i.e., an egg cooked until both yolk and white are coagulated and solid) shell eggs. While the heating process may result in physiochemical changes to the interior components of the egg, in preferred embodiments, there is no coagulation of the egg white or the egg yolk, preferably both. Alternatively stated, in preferred embodiments, there is no visible coagulation in the albumen or the yolk of the egg, preferably both. As a further alternative description, there is preferably no significant coagulation in the albumen or yolk, more preferably both, of pasteurized shell eggs according to the present invention. As yet another alternative description, in preferred embodiments, there is substantially no coagulation of the albumen or yolk, more preferably both, of pasteurized shell eggs according to the present invention.

The thermal treatments described herein can markedly reduce Salmonella spp. in shell eggs without significant changes to the functional properties or appearance of the heated shell eggs. Pasteurized shell eggs according to the present invention may be used for essentially any purpose that untreated shell eggs are used. The heating process may result in some changes in physiochemical properties, e.g., longer whip time to form an egg white meringue; nonetheless, the pasteurized eggs may be used to form sponge cakes, chiffon desserts, omelets, meringues, soft-boiled, soft-poached, and "sunny-side" fried eggs, French toast, custards, sauces (e.g., hollandaise, bernaise), Caesar salad dressing, eggnog, or any other food product in which shell eggs may be used. The flavor, texture, and appearance of these products is similar to those made using unpasteurized Grade A shell eggs.

According to the present invention, the humidity controlled air stream is preferably provided to the shell egg(s) as a stream, more preferably as circulating currents (e.g., convection currents) of air. Still more preferably, the currents of air are substantially uniform to achieve a sufficiently uniform rate of heating of the eggs throughout the heating chamber or tunnel. In particular embodiments, the humidity controlled air is circulated by means of a fan that is generated at about 500 to 3000 rpm, preferably about 750 to 2500 rpm, more preferably at about 1000 to 2000 rpm. Alternatively stated, the humidity controlled air is circulated in the heating chamber at a rate of about 50 to 2000 ft/min, preferably at about 100 to 1000 ft/min, more preferably at about 150 to 750 ft/min, still more preferably at about 200 to 500 ft/min.

Any suitable level of relative humidity in the humidity controlled air delivered to the shell eggs that provides efficient heat transfer to the shell egg(s) may be employed according to the present invention. In particular embodiments, the humidity controlled air has a relative humidity of at least approximately 60%, 70%, 80%, 90%, 95%, 99% or more. In other embodiments, the relative humidity of the air does not exceed approximately 100%, 99%, 97%, 95%, 90%, or 85%. According to other particular embodiments, the humidity controlled air has a relative humidity of approximately 60% to 100%, 80% to 100%, 90% to 100%, or 95% to 100%. As used herein, the "relative humidity" of the air refers to the ratio of the actual vapor pressure of the air to the saturation vapor pressure.

In some embodiments of the invention the humidified air will be saturated humidified air. In alternative embodiments, the relative humidity of the humidified air will be less than saturated.

In alternative preferred embodiments, the relative humidity of the humidity controlled air does not exceed the dew point of the air as can be determined from standard reference charts under a given set of processing conditions (see, e.g., K. Wark, (1977) THERMODYNAMICS, FIG. A-25, McGraw-Hill, Inc.). The "dew point" is the temperature at which water vapor begins to condense. Alternatively stated, the "dew point" is the temperature to which a given air-water mixture needs to be cooled to initiate condensation of water. In alternate embodiments, the relative humidity of the air is at or below the dew point.

Moreover, it is preferred that the relative humidity of the humidity controlled air not be so high as to result in water beading up or condensing on the exterior of the shell eggs or the interior of the oven. Generally, the shell eggs will have shiny appearance or glow, but will not be moist or wet to the touch. While not wishing to be held to any theory of the invention, in appears that the monomolecular film of water created at the surface of each egg provides the same heat transfer efficiency as bulk water without having the drawback of washing off the protective cuticle from the egg shell surface. The air is humidified with an aqueous liquid, preferably water, more preferably potable or distilled water. Alternatively, the aqueous liquid is an aqueous salt solution.

In particular preferred embodiments of the invention, the eggs are not immersed in an aqueous solution during the come-up time to bring the egg contents to the target temperature for Salmonella destruction. It is also preferred that the shell eggs are not immersed in an aqueous solution during the holding or pasteurization period. In more preferred embodiments, the eggs are not immersed in an aqueous solution during the entire pasteurization process (i.e., come-up and holding times). It is further preferred that the eggs are not immersed in an aqueous solution during the cooling process following pasteurization.

Optionally, and advantageously, the eggs may be agitated or rotated within the humidity controlled air to facilitate heat transfer and promote uniform heating.

The present invention can be practiced to achieve inactivation of any Salmonella spp. Species of Salmonella that may be reduced or eliminated according to the present invention include, but are not limited to *S. blockely, S. enteritidis, S. heidelberg, S. montevideo, S. newport, S. oranienburg, S. paratyphi, S. typhi,* and *S. typhimurium.* In particular, the present invention may be practiced to reduce or eliminate *S. enteritidis* contamination of shell eggs.

The methods of the present invention may be practiced to achieve at least about a 3-log, more preferably, at least about a 5-log, yet more preferably, at least about a 7-log, still more preferably, at least about a 9-log reduction in Salmonella spp. in the treated shell egg. Those skilled in the art will appreciate that the thermal treatments (i.e., time and temperature) described herein can be routinely modified to achieve the desired level of Salmonella destruction. The reductions in Salmonella spp. may be achieved in the albumen and/or the yolk of the shell egg, more preferably the yolk, yet more preferably the center of the yolk.

In alternate preferred embodiments, the methods of the present invention may be practiced to produce eggs in which no detectable Salmonella spp. (e.g., *Salmonella enteritidis*) are present.

After maintaining the eggs in the humidity controlled air at the target pasteurization temperature for the desired time (e.g., a predetermined time(s) and/or temperature(s)), the eggs may be removed and allowed to cool at room temperature. Cooling may also be effected by other means, such as by direct refrigeration, a cold aqueous bath, or by currents of cooled humidity controlled air. Those skilled in the art will understand that the inventive methods may be used to cool the eggs to ambient temperatures, refrigerated temperatures, or any other desired temperature in accordance with the particular process specifications. The heat treatment received by the shell egg after removal from the humidity controlled air may be considered in determining the total thermal treatment received by the shell egg.

According to embodiments in which humidity controlled air is used to cool the egg, it is preferred that the cooled humidity controlled air has a relative humidity of at least about 60%, 70%, 80%, 90%, 95%, 99% or more. Alternatively, the relative humidity of the cooled humidity controlled air is less than about 90%, 80%, 70%, 60% or even 50%. As described above, it is also preferred that the humidity be below the dew point for the given processing conditions. It is also preferred that the humidity be controlled so as to avoid condensation forming on the surface of the shell egg. Typically, the cooled humidified air is at a temperature of less than about 55° F., 50° F., 40° F., 38° F., 35° F., 33° F., 32° F. or even 30° F. (i.e., 12.8° C., 10° C., 4.4° C., 3.3° C., 1.7° C., 0.6° C., 0° C., or even −1.1° C.).

The shell eggs are cooled with humidity controlled air according to the present invention for a time of at least about 5, 10, 15, 20, 25, 30, 40, 50, 60, 75 minutes or more. In particular preferred embodiments, the shell eggs will be cooled after pasteurization by exposing the eggs to cooled humidity controlled air at about 30° F. to 55° F. (−1.1° C. to 12.8° C.), preferably at about 33° F. to 40° F. (0.6° C. to 4.4° C.) for about 15 to 30 minutes.

The pasteurized shell eggs may be cooled to any desired temperature. For example, the eggs may be cooled to ambient temperatures (for example, about 66° F. (18.9° C.) to 76° F. (24.4° C.), preferably about 68° F. (20° C.) to 72° F. (22.2° C.)), temperatures of about 55° F. (12.8° C.) to 65° F. (18.3° C.), or refrigerated temperatures of about 40° F. (4.4° C.) to 55° F. (12.8° C.) or less.

As will be appreciated by those skilled in the art, after thermally treating the shell eggs, the shell eggs may be oiled or waxed in accordance with known techniques with a suitable oil (e.g., mineral oil) or other approved coating to improve the keeping quality of the eggs.

For storage and shipping, shell eggs of the present invention may be packaged in a suitable container, such as egg cartons or egg flats, constructed of materials such as cardboard or plastic polymer. Shell eggs produced by the methods of the present invention preferably receive a thermal treatment such that the shell eggs have a shelf life of at least about 3, 4, 8, 12, 24 or 36 weeks or more under refrigerated conditions. The term "refrigerated" as used herein means the eggs are stored at a temperature of approximately 39–40° F. (4° C.). In alternate embodiments, the eggs have a shelf life of at least about 2, 3, 4, 6, 8, or 12 weeks or more when stored at room temperature (e.g., a temperature of approximately (71–77° F./22–25° C.).

The inventive methods may be carried out by a continuous or batch process. Furthermore, the methods may be modified for use in a commercial setting. A plurality of eggs (e.g., in flats or in stacks of flats) may be treated at once according to the present invention as long as sufficient uniformity in the thermal treatments delivered to the shell eggs throughout the flat(s) is achieved. Those skilled in the art will appreciate that the heating times described herein may be somewhat longer for stacked flats of eggs. Modifications and optimizations of the parameters given herein may be routinely accomplished by routine methods by those skilled in the art using the description herein as a guide.

Another aspect of the present invention is a pasteurized shell egg produced by the inventive methods described hereinabove. The shell egg is any poultry egg as described above. Preferably, the pasteurized shell egg is a chicken shell egg. The pasteurized shell egg preferably has at least about a 3-log reduction, more preferably, at least about a 5-log reduction, yet more preferably at least about a 7-log reduction, still more preferably, at least about a 9-log reduction in Salmonella spp (e.g., *Salmonella enteritidis*) as compared with unpasteurized shell eggs, as described in more detail above. Preferably, the pasteurized shell egg contains no detectable Salmonella spp. (e.g., *Salmonella enteritidis*).

The functional properties of the pasteurized shell egg are preferably essentially the same as for untreated eggs, and pasteurized eggs according to the present invention can be used for essentially all of the purposes for which untreated shell eggs are used. Both of these points are discussed in more detail above with respect to methods of pasteurizing shell eggs using the present invention.

It is preferred that the pasteurized shell egg has an extended refrigerated shelf life as described in more detail hereinabove. It is further preferred that the pasteurized shell egg have no significant coagulation, alternatively stated, no substantial coagulation or visible coagulation, also as described in more detail above.

A further aspect of the present invention is a method of sanitizing the surface of a shell egg to inactivate pathogenic and spoilage organisms, in particular, Salmonella spp. (as described above). According to this embodiment, the shell egg is contacted with humidity controlled air containing a sanitizing agent, e.g., hot potable water or a chlorinated water solution. The humidity controlled air containing the sanitizing solution may be heated, cooled or at an ambient temperature. Likewise, the sanitizing process may be combined with heating and/or cooling the eggs during the pasteurization process. The shell eggs will be contacted with the humidity controlled air containing the sanitizing solution for any time sufficient to achieve inactivation of surface microorganisms, in particular, Salmonella spp. There are no particular upper or lower limits for the contact time, as long as the contact is for a sufficient time to achieve the desired reduction in surface microorganisms. Typically, the contact time will be more than about 15, 30, 45, 60, 90, 120, 150, 180, 240 or 300 seconds. In particular preferred embodiments, the contact time will be from about fifteen seconds to three minutes, preferably from about thirty seconds to sixty seconds.

The present invention is explained in greater detail in the following Examples. These Examples are intended to be illustrative of the present invention, and are not to be construed as limiting thereof.

EXAMPLE 1

Studies were carried out to determine internal temperature profiles for eggs heated in humidified air. The experiments described herein were conducted using a commercial COMBITHERM® Combination Oven/Steamer (Model 7-14 G; Alto-Shaam, Inc., Menomonee Falls, Wis.). Fresh shell eggs (2 to 3 days old, held at 40° C. prior to experiment, weighing 62±2 grams/egg) at ambient temperature were placed in commercial plastic egg flats and heated in the oven. Small diameter thermocouple probes were placed in both the oven chamber and within several intact eggs (center of egg yolk or within the egg albumen) and temperatures were recorded throughout the process at 10–15 second intervals.

Among the advantageous features of the COMBITHERM® oven is the ability to closely monitor and control the temperature, relative humidity, and airflow within the egg heating zone. The relative humidity of the air in the COMBITHERM® oven chamber may be precisely regulated by controlling the injection of steam or the injection of liquid water onto a heat exchanger. At a relative humidity level of 80% at 136° F. (57.8° C.) in the chamber, the air is approximately 11% moisture (w/w) based on reference psychrometric charts. Similarly, at 136° F. (57.8° C.) and 100% relative humidity, the air in the oven contains approximately 13% moisture (w/w).

The uniform convection airflow in the COMBITHERM® is generated by a high-speed fan that operates at approximately 1,600 revolutions per minute (rpm). The uniformity and speed of the air flow promote uniform and rapid heat transfer to the shell egg(s).

In the first study, the oven temperature was initially set at 132° F. (55.6° C.), and the oven dry bulb temperature reached this temperature within 8 minutes of beginning the heating process (FIG. 1). A single plastic flat of 30 eggs was heated. The albumen (i.e., the egg white) heated more quickly than the egg yolk. The egg albumen was within 0.5° F. of the oven dry-bulb temperature within 11 minutes of the start of the heating process. The center of the egg yolk was within 0.5° F. of the oven dry-bulb temperature within 23 minutes of the start of the heating process. For comparison purposes, a center egg pre-heating time of 35 minutes is typical for eggs heated by hot water immersion (J. D. Schuman et al., (1997) *J. Applied Microbiology* 83:438). At this point, the oven set point was increased to 133° F. (56.1° C.), without opening the oven door, for the remainder of the experiment. As shown in FIG. 1, the temperatures of the oven and at the center of the egg were closely coupled for the remainder of the holding period.

In the second trial, the initial oven set-point was 136° F. (57.8° C.), and the oven dry bulb temperature reached this temperature within approximately 6 minutes from the onset of heating (FIG. 2). A comparison of the oven dry bulb (TC-1) and wet bulb (TC-2) temperature data shows that the circulating air within the oven was essentially saturated with moisture within only 7 minutes of the commencement of the heating process. Three stacked flats of 30 eggs each were heated, and egg internal temperatures were recorded using the middle layer flat. Again, the egg albumen heated more quickly (preheat time=18 minutes) than the center of the slowest-heating monitored eggs (preheat time=26 minutes). After pre-heating, uniform egg internal temperatures were maintained throughout the 33-minuted hold period evaluated (FIG. 2). After cooling the eggs to below 110° F. (43.3° C.) (using a cool water spray), multiple eggs were broken out and the contents examined. These tests confirmed that the internal quality and appearance of the eggs were similar to that observed with water-immersion heated eggs (and to untreated shell eggs).

EXAMPLE 2

Studies were undertaken to determine the thermal inactivation kinetics of Salmonella spp. in liquid whole egg (LWE) and within the center of intact shell eggs subjected to in-shell pasteurization temperatures. Pre-heating and holding of the intact eggs was accomplished using a convection oven capable of maintaining high humidity (>95% relative humidity) conditions.

Materials and Methods
Phase I
Heating Menstrum

Ultrapasteurized 'plain' LWE was supplied from a recent production lot by M. G. Waldbaum Company. On the day of testing, duplicate samples of uninoculated LWE were tested to determine pH, total solids (AOAC Official Method 925.30), standard plate counts (Plate Count agar, Difco, Becton Dickinson Microbiology Systems, Becton Dickinson and Company, Sparks, Md.), and total coliform counts (VRBA agar, Difco).
Salmonella Strains Six Salmonella strains were used in this study: *Salmonella enteritidis*, Benson-1 (phage type 8, human clinical), *S. enteritidis*, ME-14 (phage type 14B, poultry manure), *S. enteritidis*, ME-18 (phage type 14B, live poultry), *Salmonella heidelberg*, UN-L (unknown), *S. enteritidis*, H3353 (phage type 4, egg), and *S. typhimurium* (DT104, human clinical). All cultures were maintained on tryptic soy agar (TSA, Difco) slants at 4° C. Cultures were activated in tryptic soy broth (TSB, Difco) at 37° C. at least twice for 24-h periods prior to being used. Twenty-four-hour cultures of each strain were sedimented by centrifugation (approximately 1,800×g, 10 min.), (IEC Clinical Centrifuge, International Equipment Co., Needham Heights, Mass.), and pellets were washed once in 0.1% peptone water (Difco) and recentrifuged. Each cell pellet was resuspended and mixed well in 10 ml of LWE to yield an initial inoculum level of approximately $6.8\times10^8$ cfu/ml of LWE. During preliminary work, each culture was streaked for isolation onto Xylose Lysine deoxycholate (XLD, Difco) agar to verify colony morphology.

Thermal Inactivation in Capillary Tubes

Fifty $\mu$l aliquots of each strain were dispensed into sterile capillary tubes (Kimax-51, 0.8–1.10×90 mm, Kimble Products, Vineland, N.J.) using a 1 ml syringe (Becton Dickinson and Company, Sparks, Md.) with a 22 gauge×4-inch hypodermic needle with deflection point (Popper & Sons, Inc., New Hyde Park, N.Y.). The capillary tubes were then heat-sealed and stored in an ice slurry for up to 2 hrs before use. Ten minutes before heating, each set of capillary tubes was brought to room temperature by immersion in a tray of water at ambient temperature (about 22° C.). Sets of tubes were then fully immersed in a pre-heated circulating water bath (Thermomix 1480, B. Braun, Melsungen, West Germany) at 56.67° C. (134° F.). For each trial, a thermocouple was placed in a capillary tube of uninoculated LWE to document come-up times and actual egg temperatures. At 5-minute intervals, duplicate tubes were removed from the bath and rapidly cooled in an ice water slurry and held for up to one hour before plating. Tubes were removed at 5, 10, 15, 20 and 25 minutes after reaching the time-zero target temperature. Two experimental trials were conducted for each of the six Salmonella strains.
Enumeration of Survivors Capillary tubes were briefly immersed in 70% ethanol and allowed to dry before transferring to individual sterile test tubes containing 9.9 ml of 0.1% peptone water (pH=7.0) and crushed using a sterile glass rod. After vortexing, serial dilutions were spread-plated onto duplicate TSA plates. TSA plates were incubated for 48 hours at 35° C. and counted to determined surviving cfu/ml of liquid egg. For the latter two dwell times yielding survivors, one representative colony from each countable (30–300 colonies) plate was streaked for isolation onto XLD agar and incubated for 48 hours at 35° C. to verify its identity as Salmonella.
Phase II
Shell Eggs Nest-run shell eggs were obtained from a single flock within 24 hours of being laid. Eggs were sorted to obtain eggs weighing 62±2 g each. Eggs were washed in warm soapy tap water until the shell surfaces were free of visible debris, rinsed by immersion in a beaker of ambient temperature sterile water, and allowed to air dry on plastic flats for 2 hrs. Eggs were then inspected to remove any eggs with visible cracks or checks. The eggs were stored overnight at room temperature (22° C.) so that the egg age at the time of heating was approximately 48 hours post-lay. As an indicator of egg freshness, the separated whites (albumen) of three uninoculated eggs were collected, gently blended, and the pH determined on the day of egg inoculation/heating. The albumen pH values in trials 1 and 2 were 8.89 and 8.86, respectively.
Culture Preparation An inoculum cocktail consisting of the six strains described in Phase I was used to inoculate the eggs. Working stock cultures were prepared by transferring a loopful of each culture to 10 ml of TSB and incubating at 37° C. for 24 hours. Sixty $\mu$l of each 24 h culture were added to a centrifuge tube containing 30 ml of TSB and incubated at 37° C. for 24 hours. The 30 ml cultures were centrifuged for 15 minutes at 9000×g (4° C.), and the cell pellets were each resuspended in 3 ml of sterile 0.1% w/v peptone water (PW) and pooled into a single sterile test tube to yield the final six-strain inoculum suspension (9.5–10.79 log cfu ml$^{-1}$).
Shell Egg Inoculation Protocol Sixty eggs were placed into two 30-egg capacity perforated plastic egg flats with the blunt end of the egg facing up. The eggs in one flat were inoculated with about 10.03 log cfu of concentrated, pooled Salmonella spp. cells in 50 μl of sterile PW. This was accomplished by placing a piece of high adhesive, moisture and heat resistant tap (Anchor) over the blunt end and perforating the egg shell through the tape using a 2.54 cm/23 gauge sterile needle (Becton Dickinson) coupled to a calibrated 50 μl repeating syringe (Hamilton Co., Reno, Nev.). Inoculated eggs were held at room temperature for less than 1 h prior to heating. Preliminary trials involving inoculation of 50 μl of dye into the yolk followed by a standard hard-cooking procedure demonstrated that this inoculation procedure provided consistent placement of the dye near the center of the yolk with no detectable inoculum drift (data not shown).

The other flat of eggs was used to record the temperature of the eggs. Tape was affixed to 6 eggs. An empty egg flat was placed over the eggs and type T hypodermic rigid thermocouple probes (38 mm×1.6 mm diameter, Omega, Stamford, Conn.) were placed into the 6 eggs and secured to the top flat to measure the temperature at the geometric center of control eggs. The temperature data was collected at 1-minute intervals via a HOTMUX Temperature Data Logger (DCC Corporation, Pennsauken, N.J.) connected to a personal computer.

Salmonella Inactivation Trials

The flat of eggs with the thermocouples was placed at the right back corner of a COMBITHERM® Model 7.14-G oven (Alto-Shaam Inc, Menomonee Falls, Wis.). The flat of inoculated eggs was placed in the left front corner of the oven. The oven was set on Bio-steam mode (>95% relative humidity) at a temperature of 57.2° C. (135° F.) and started. Sets of 3 eggs were randomly removed from the oven for analysis after each of the following treatment times: 0 minutes (unheated controls), and after 30, 40, 50, 60, 70 and 80 minutes of heating. At each of these pull times, 3 inoculated eggs were removed from the oven and immersed in a beaker containing 1 liter of ambient sterile water, stirred and permitted to cool for 5 minutes. Two independent trials were performed.

Enumeration of Survivors

After the 5 minutes of cooling in water at ambient temperature, the eggs were wiped dry with clean tissues, aseptically cracked open (sterile knife edge), and the contents broken out into a sterile Stomacher bag. The egg contents were then diluted 1:10 (w/w) with chilled sterile Lactose broth (Difco), and blended for 30 seconds using a Stomacher 400 (Steward, England). Samples were serially diluted onto TSA and incubated at 35° C. for 48 hours. After incubation, the countable dilutions were replica plated onto XLD agar which was incubated at 35° C. for 24 hours to confirm colony morphology.

Enrichment of Survivors

All heated egg samples with the remaining egg/lactose broth mixture were incubated for 24 hours at 35° C. to confirm survival/death (FDA, *Bacteriological Analytical Manual* 8th Edition, 1995). Selective enrichment was carried out by transferring 1 ml of enrichment to 10 ml of selenite cystine (SC, Difco) broth (35° C.). A loopful of each SC enrichment was streaked for isolation onto XLD agar (35° C., 24 hrs) to determine whether viable salmonellae were present. All suspect colonies were further confirmed on Triple Sugar Iron (Difco) agar slants.

Results

Phase I

The D-value at 56.7° C. (134° F.) for the six strains ranged from 3.05 to 4.09 minutes (Table 2). Representative survivor curves for each strain are shown at FIGS. 3–8. Plating the LWE onto PCA and VRBA failed to yield viable salmonellae. The pH of LWE used with strains ME-14, ME-18, UN-L and H3353 was 7.4 and total solids were 23.95%. For *S. enteritidis* Benson-1 and *S. typhimurium* DT104 the pH was 7.07 and the total solids were 23.63% (Table 3).

Phase II

Figure 9:
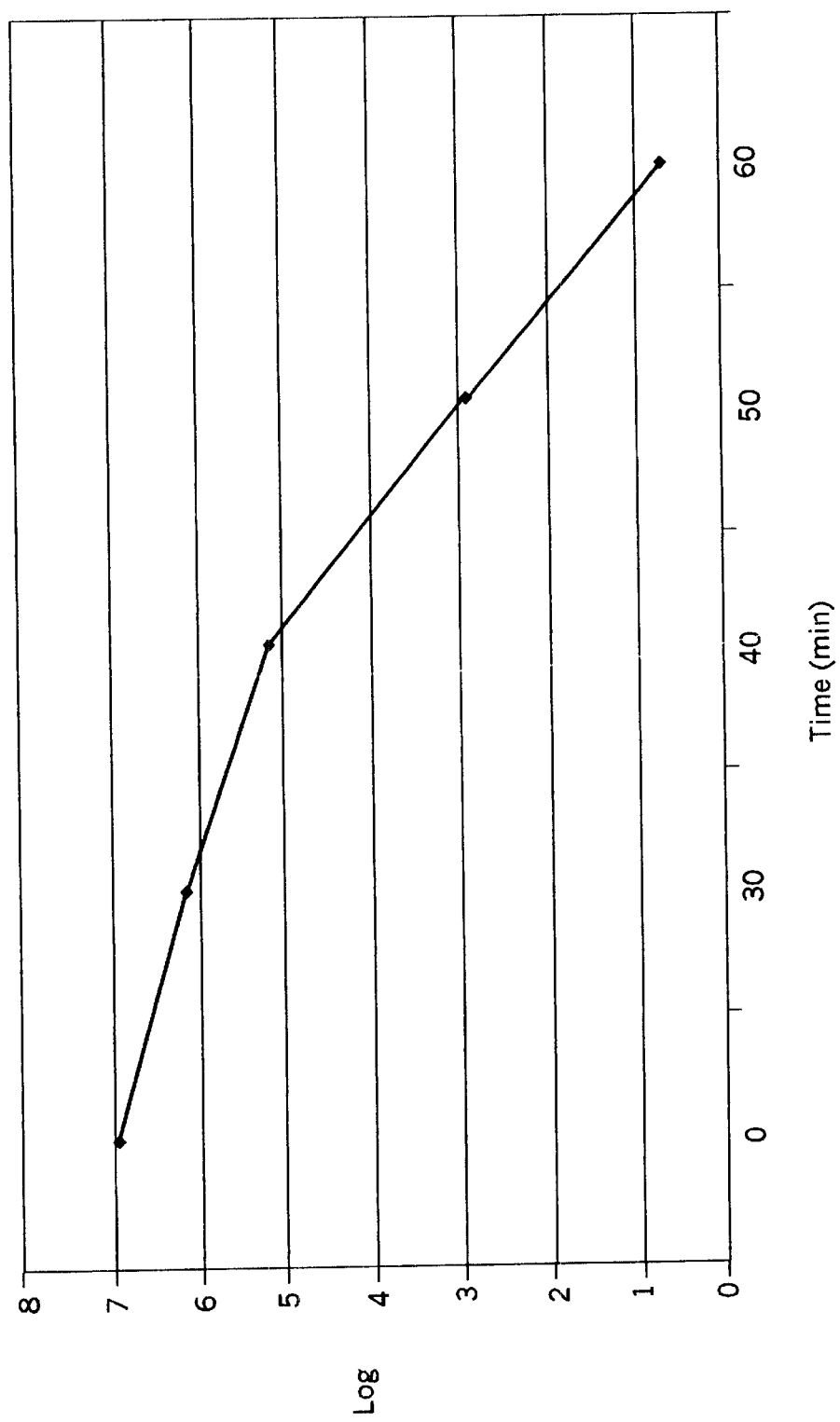
FIG. 9 is a graphical representation of surviving Salmonella spp. in inoculated shell eggs after heating for 5, 10, 15, 20 and 25 minutes at 57.2° C. (135° F.).
Figure 10:
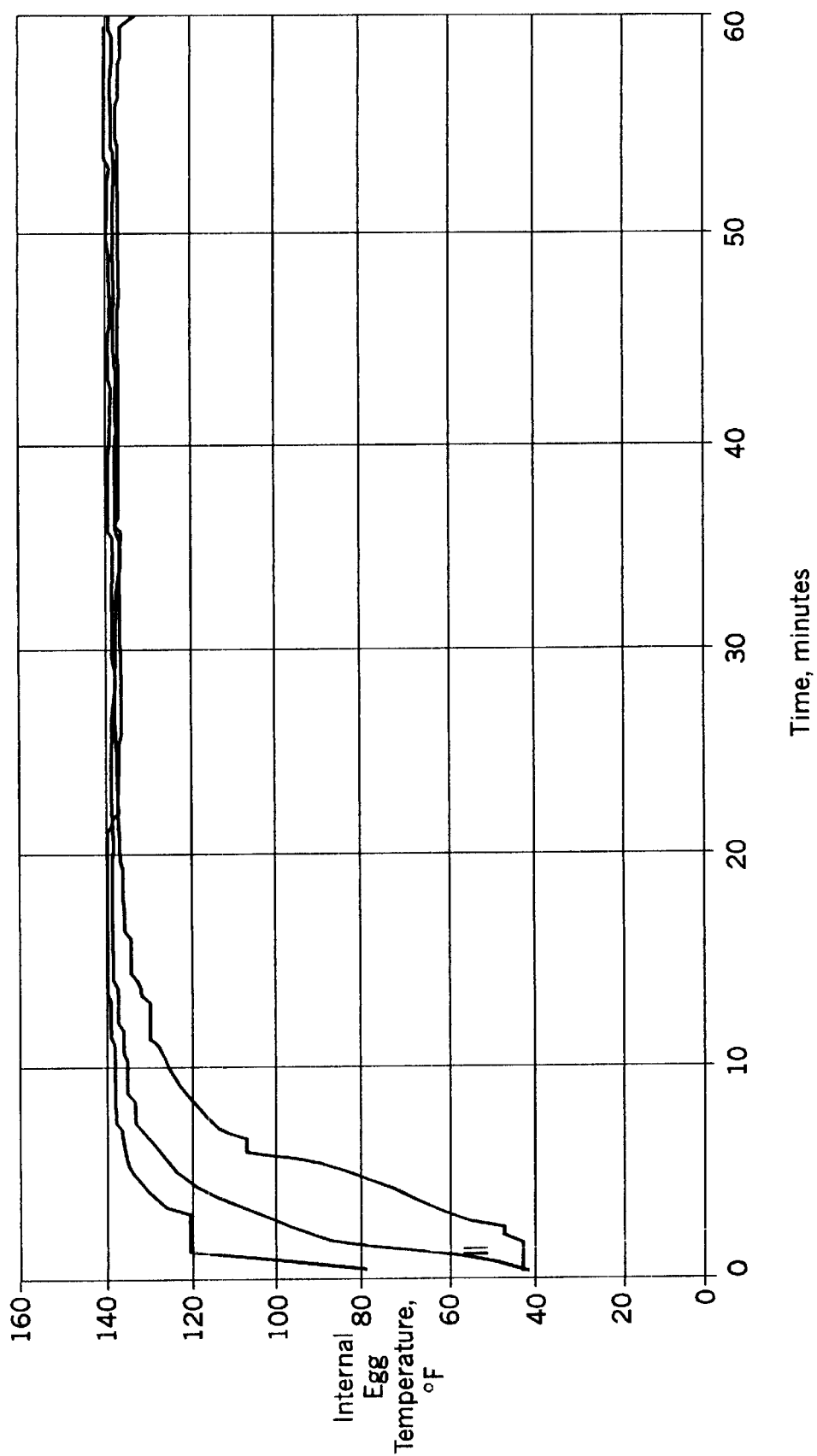
FIG. 10 is a graphical representation of the internal egg temperature for shell eggs heated in humidified air. The dry bulb temperature was set at 140° F. (60° C.) and the wet bulb temperature was set at 138° F. (58.9° C.). Air flow was 175 ft/min. Eggs were heated in a single tier.
Figure 11:
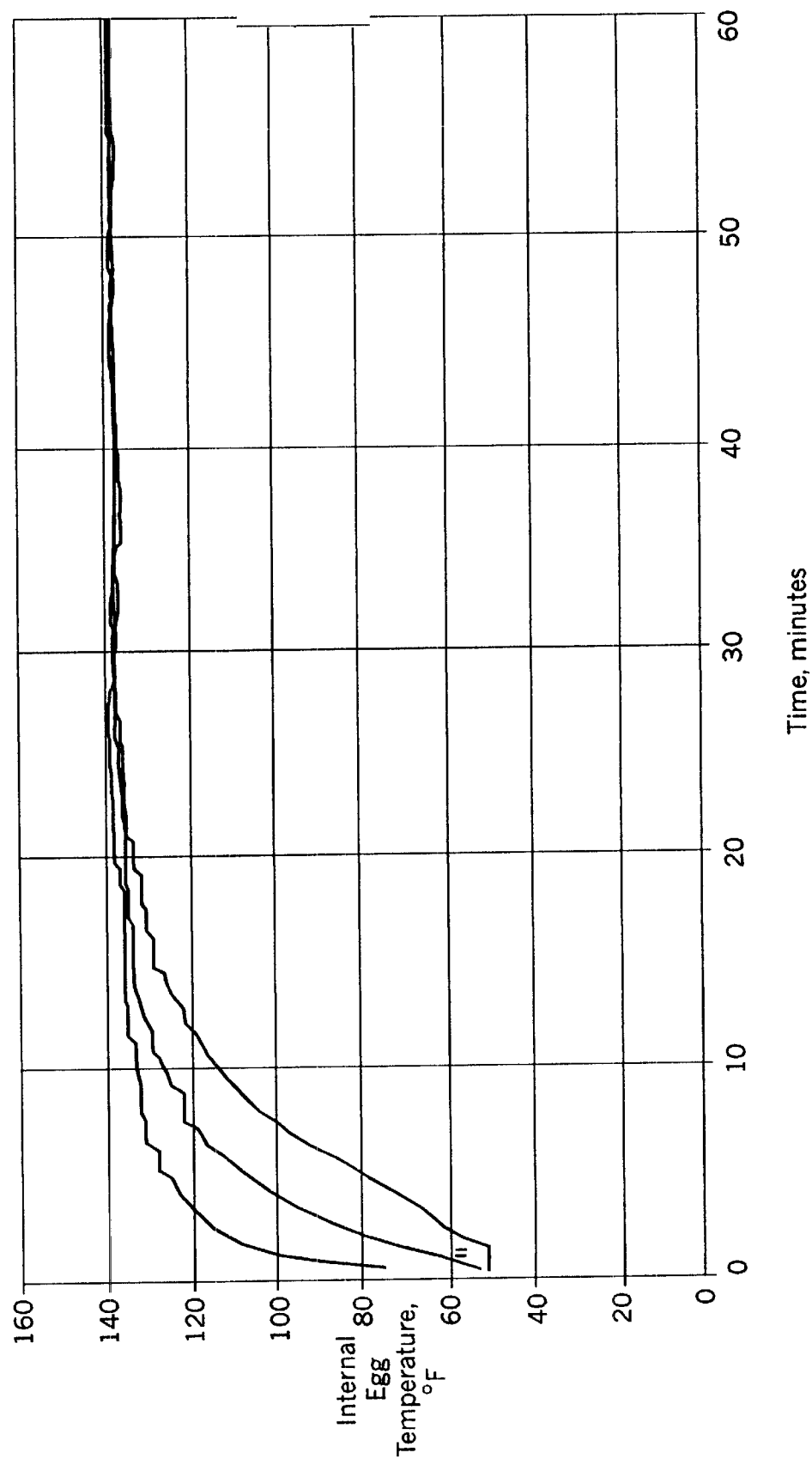
FIG. 11 is a graphical representation of the internal egg temperature for shell eggs heated in humidified air. The dry bulb temperature was set at 140° F. (60° C.) and the wet bulb temperature was set at 138° F. (58.9° C.). Air flow was 253 ft/min. Eggs were heated in a single tier.
Figure 12:
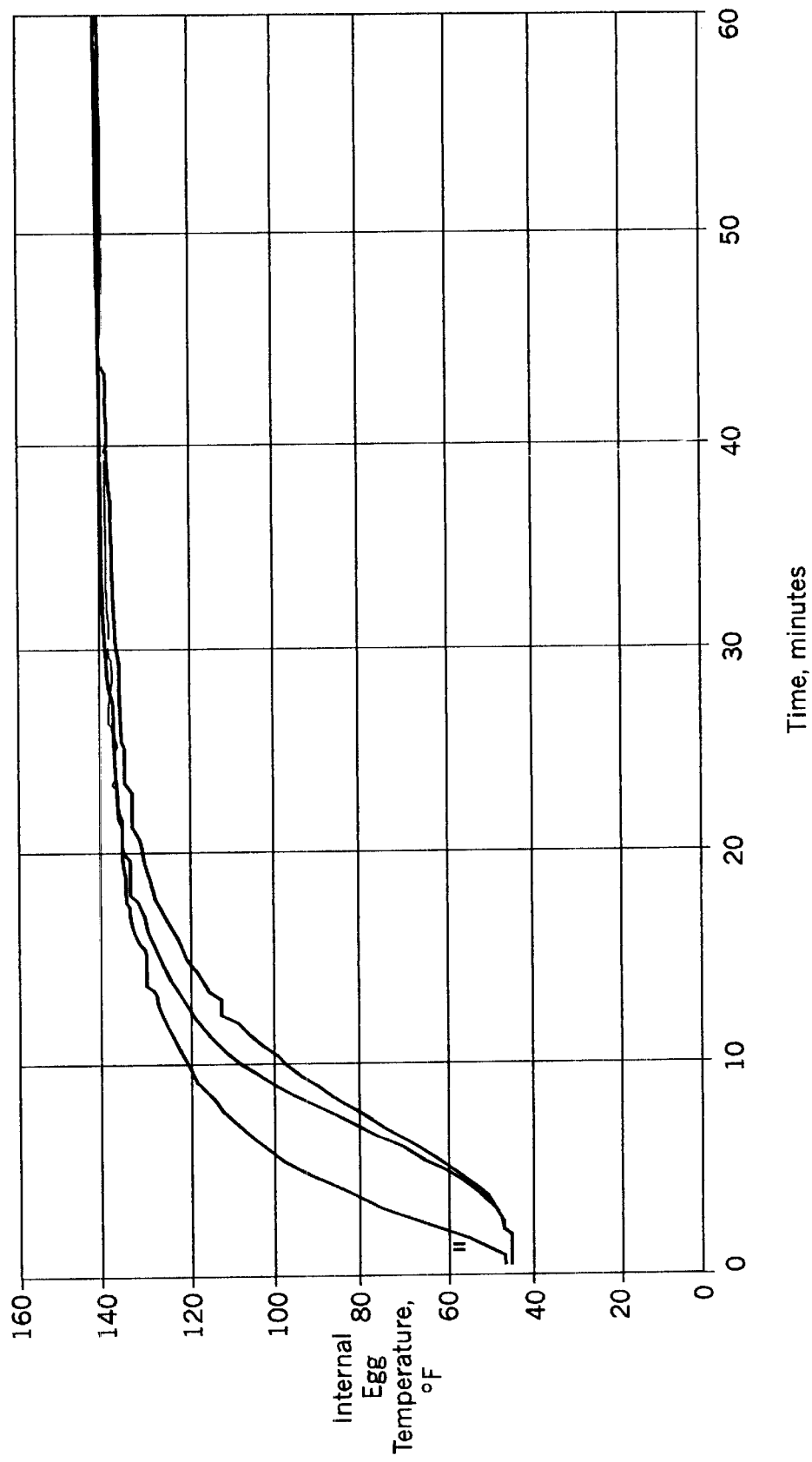
FIG. 12 is a graphical representation of the internal egg temperature for shell eggs heated in humidified air. The dry bulb temperature was set at 140° F. (60° C.) and the wet bulb temperature was set at 138° F. (58.9° C.). Air flow was 322 ft/min. Eggs were heated in a single tier.
Figure 13:
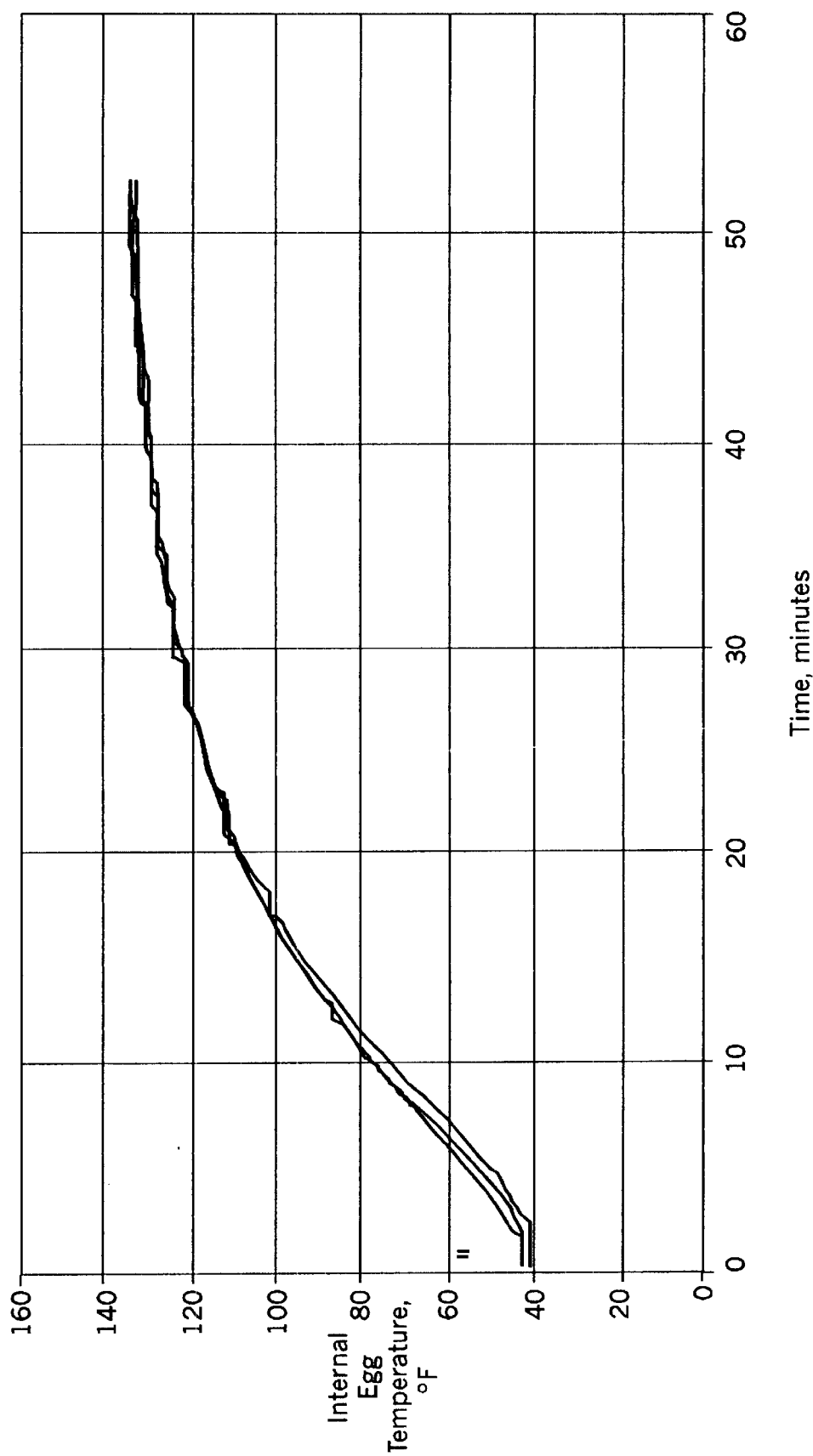
FIG. 13 is a graphical representation of the internal egg temperature for shell eggs heated in dry air. The dry bulb temperature was set at 140° F. (60° C.). Air flow was 322 ft/min. Eggs were heated in a single tier.
Figure 14:
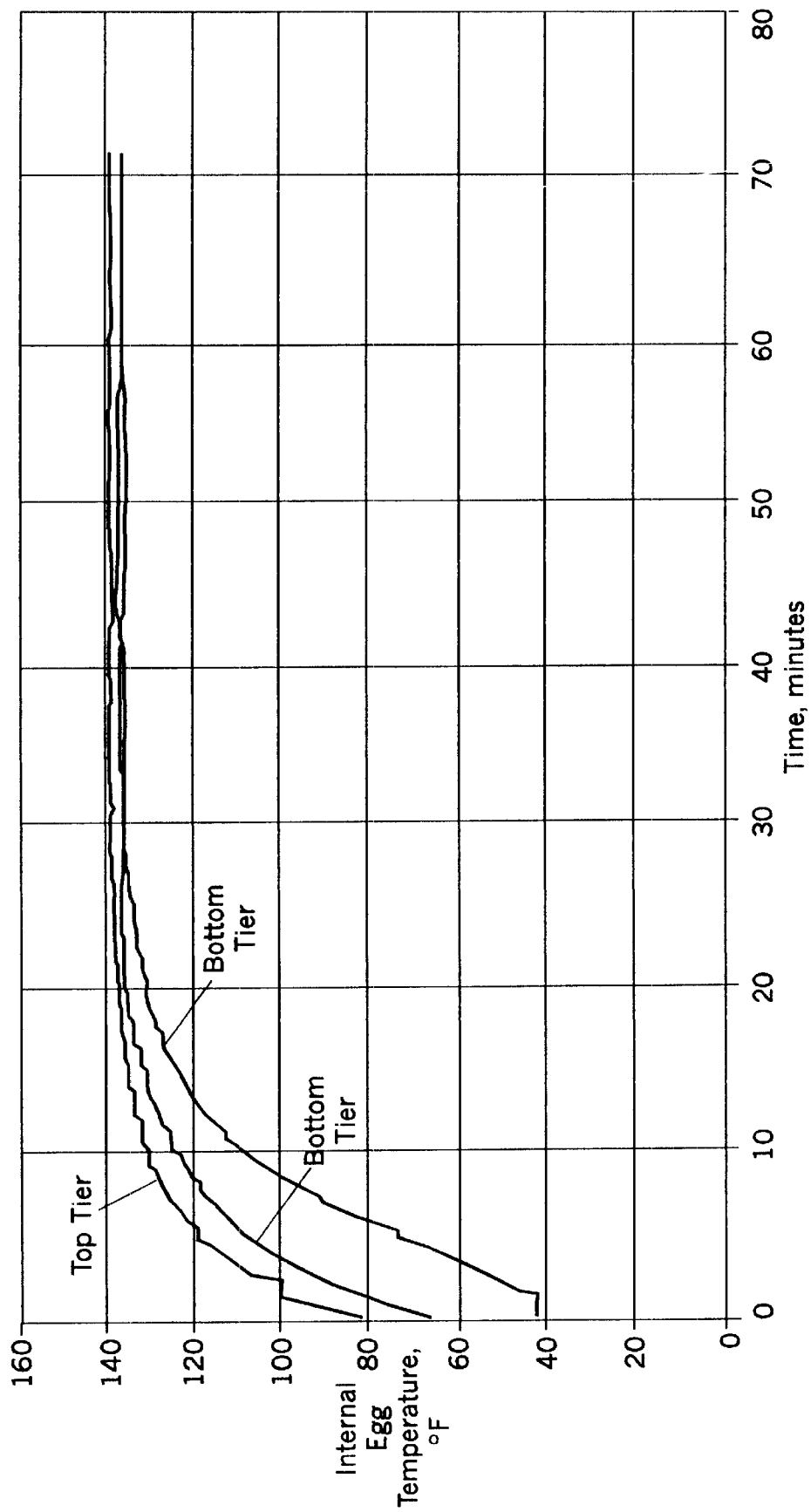
FIG. 14 is a graphical representation of the internal egg temperature for shell eggs heated in humidified air. The dry bulb temperature was set at 140° F. (60° C.) and the wet bulb temperature was set at 138° F. (58.9° C.). Air flow was 543 ft/min. Eggs were heated in two tiers.
Figure 15:
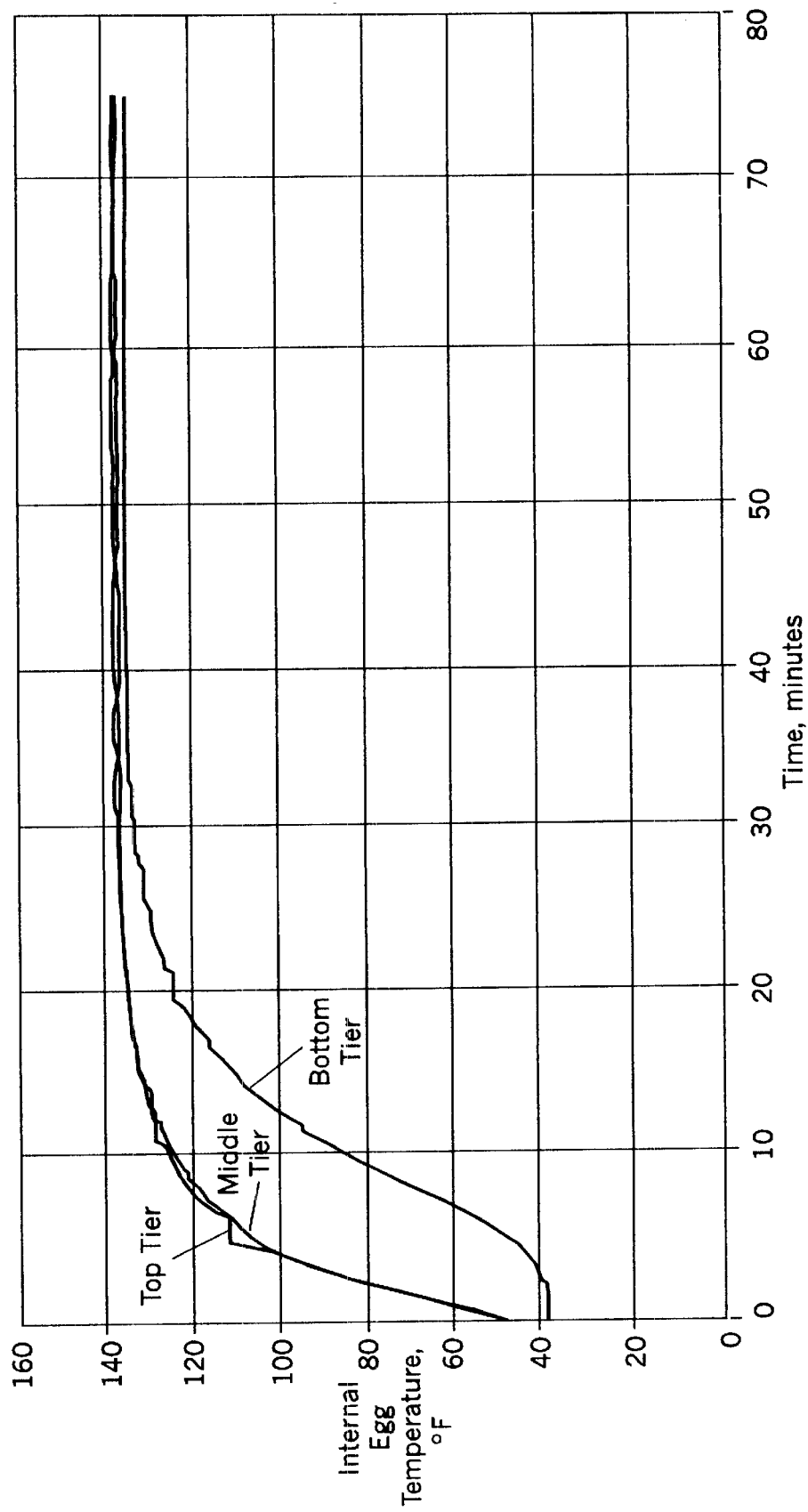
FIG. 15 is a graphical representation of the internal egg temperature for shell eggs heated in humidified air. The dry bulb temperature was set at 140° F. (60° C.) and the wet bulb temperature was set at 138° F. (58.9° C.). Air flow was 414 ft/min. Eggs were heated in three tiers.
Figure 16:
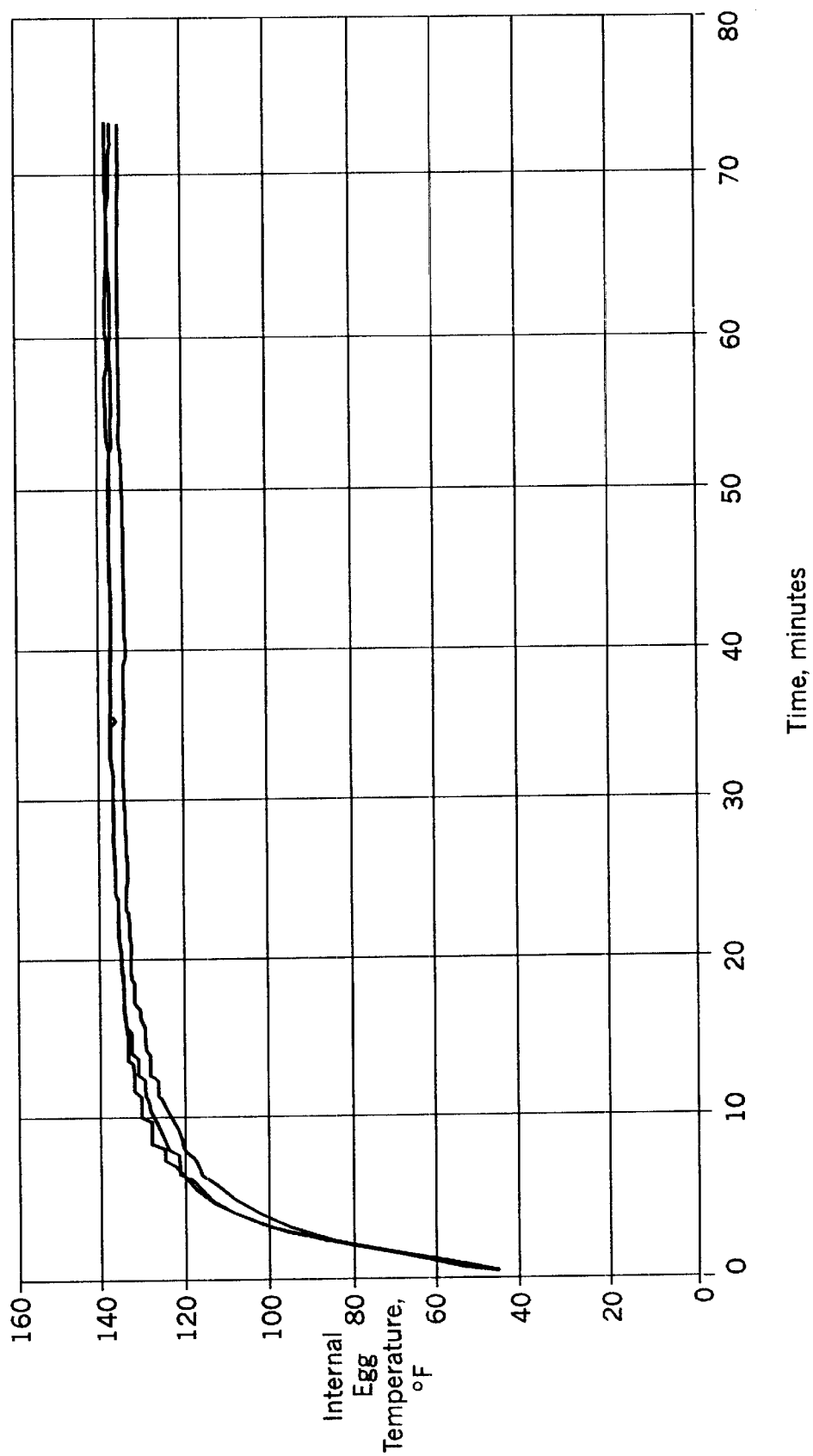
FIG. 16 is a graphical representation of the internal egg temperature for shell eggs heated in humidified air. The dry bulb temperature was set at 140° F. (60° C.) and the wet bulb temperature was set at 138° F. (58.9° C.). Air flow was 615 ft/min. Eggs were heated in a single tier.
Figure 17:
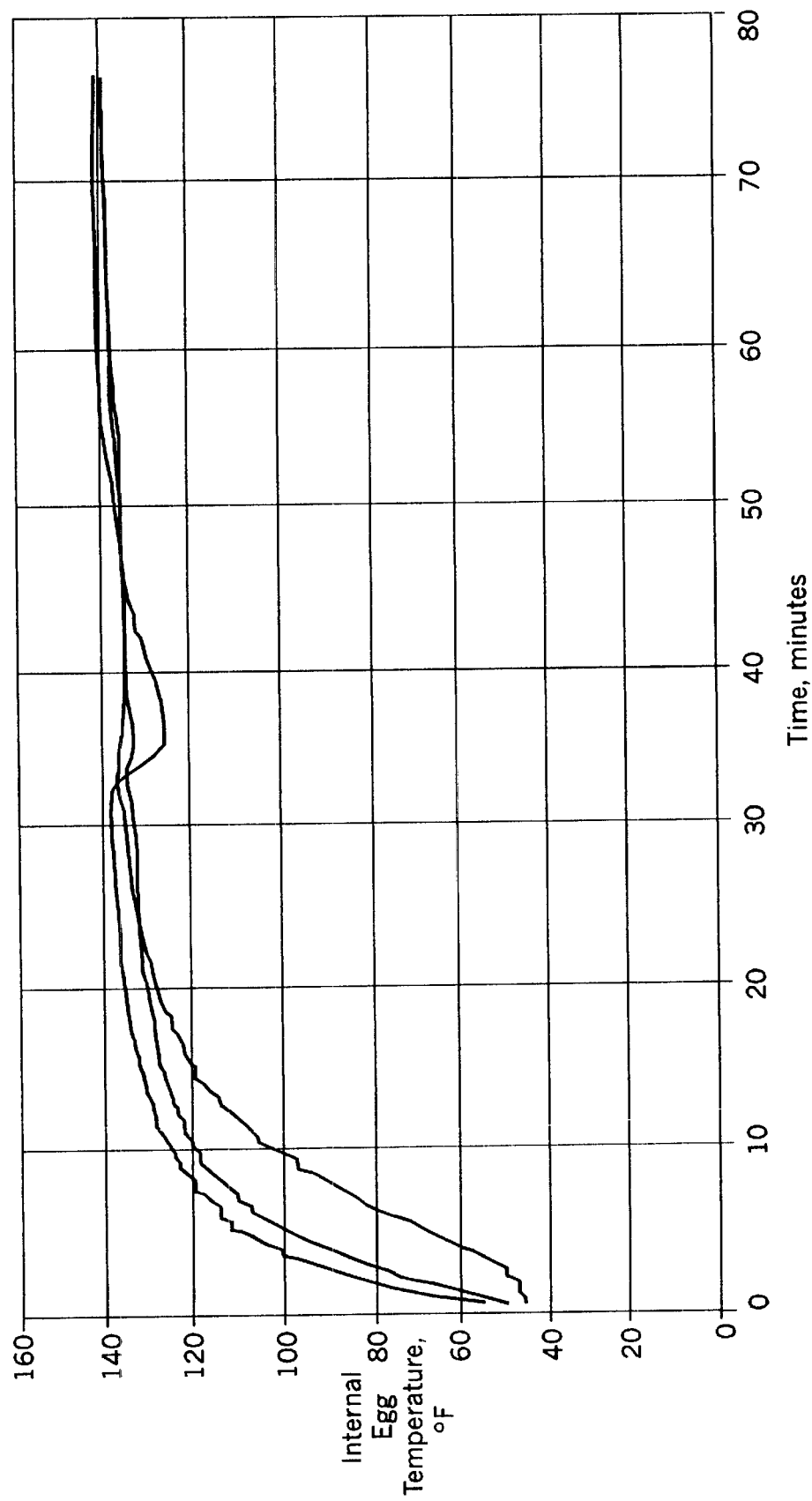
FIG. 17 is a graphical representation of the internal egg temperature for shell eggs brought up to temperature in humidified air and then held in dry air. The dry bulb temperature was set at 140° F. (60° C.) and the wet bulb temperature was set at 138° F. (58.9° C.) for the heat up time. Air flow was 615 ft/min. Eggs were heated in a single tier.
Figure 18:
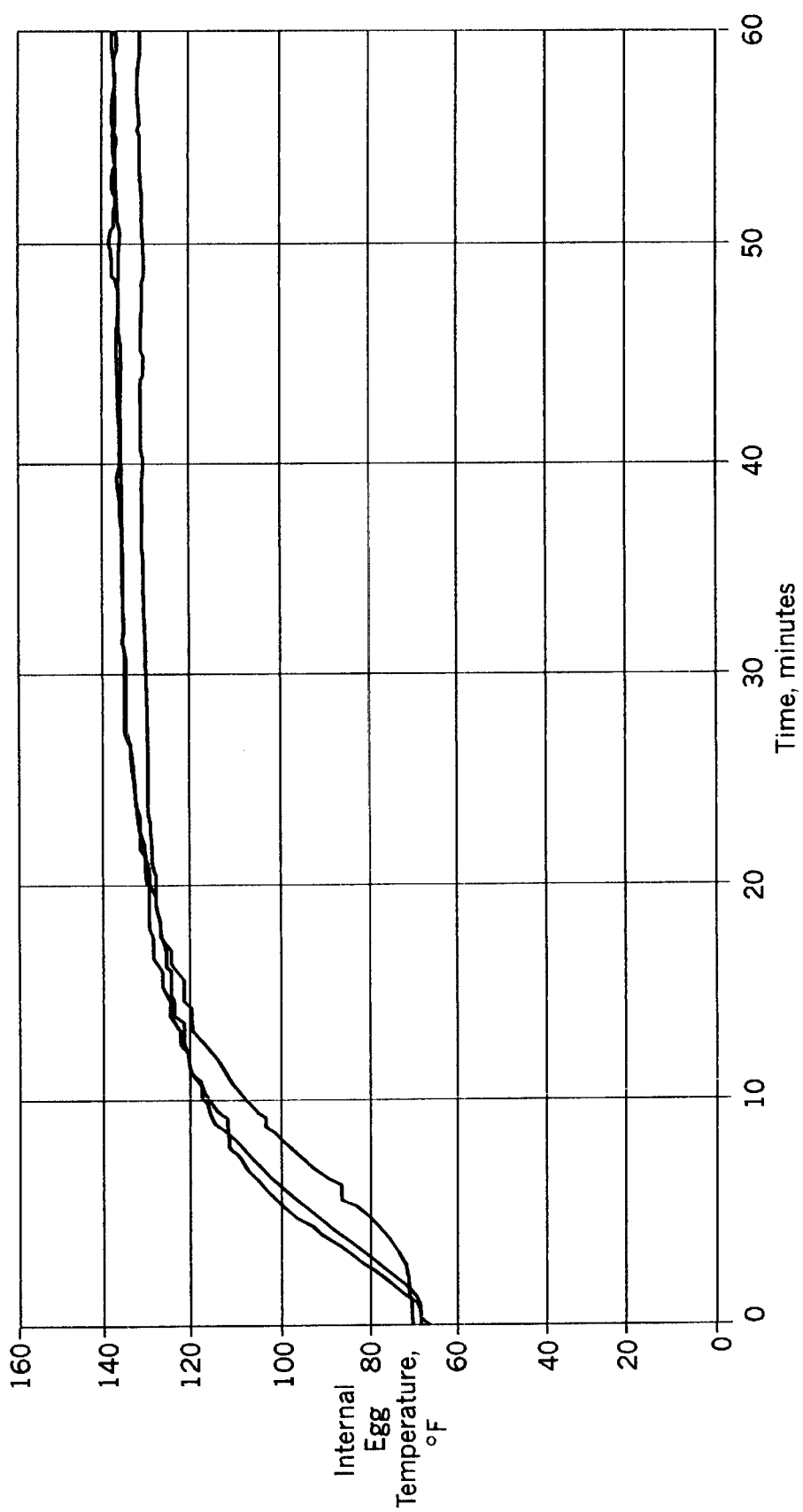
FIG. 18 is a graphical representation of the internal egg temperature for shell eggs heated in humidified air. The dry bulb temperature was set at 140° F. (60° C.) and the wet bulb temperature was set at 138° F. (58.9° C.). Air flow was 262 ft/min. Eggs were heated in a single tier.
Figure 19:
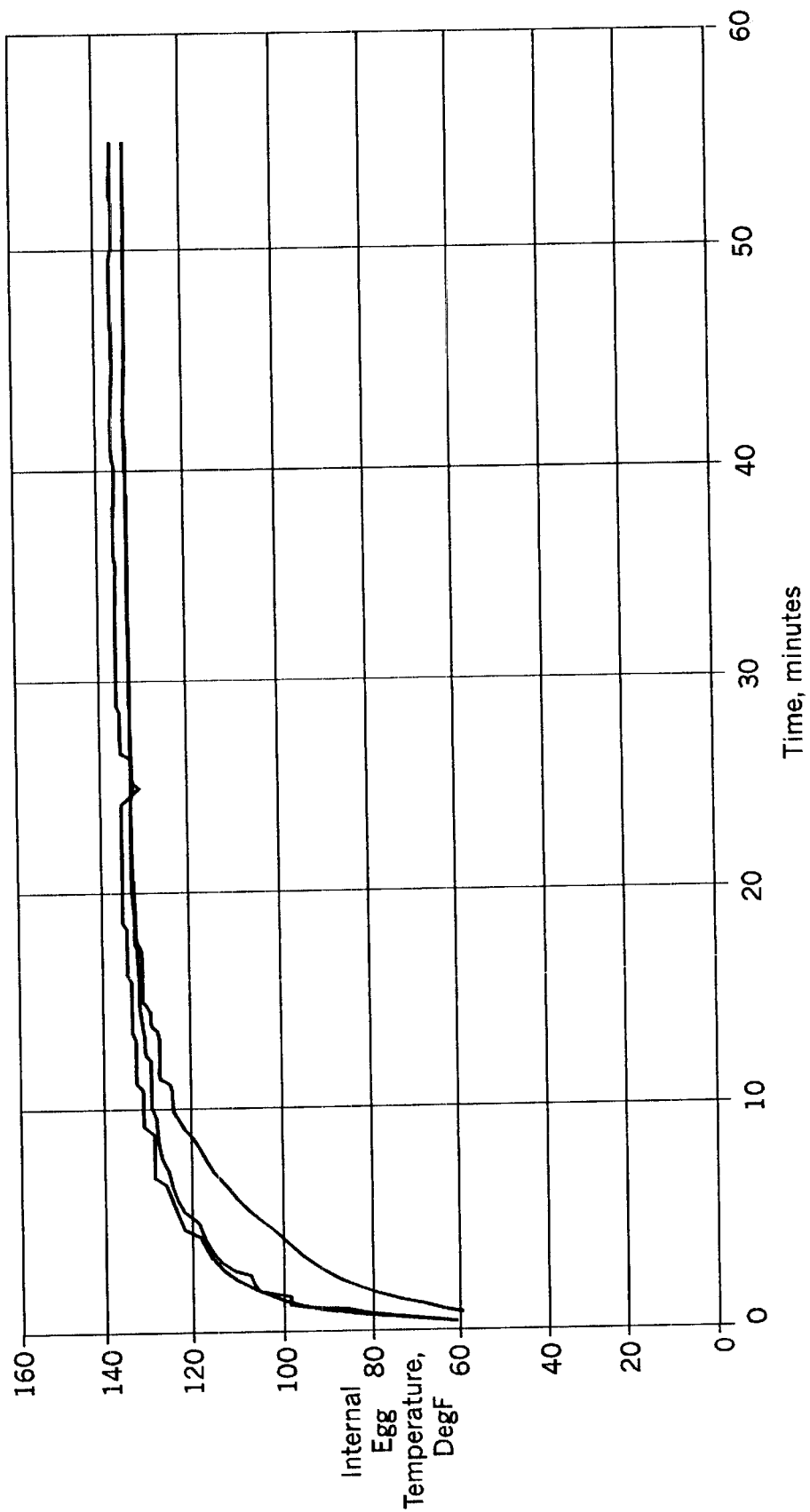
FIG. 19 is a graphical representation of the internal egg temperature for shell eggs heated in humidified air. The dry bulb temperature was set at 140° F. (60° C.) and the wet bulb temperature was set at 138° F. (58.9° C.). Air flow was 262 ft/min. Eggs were heated in a single tier.
Figure 20:
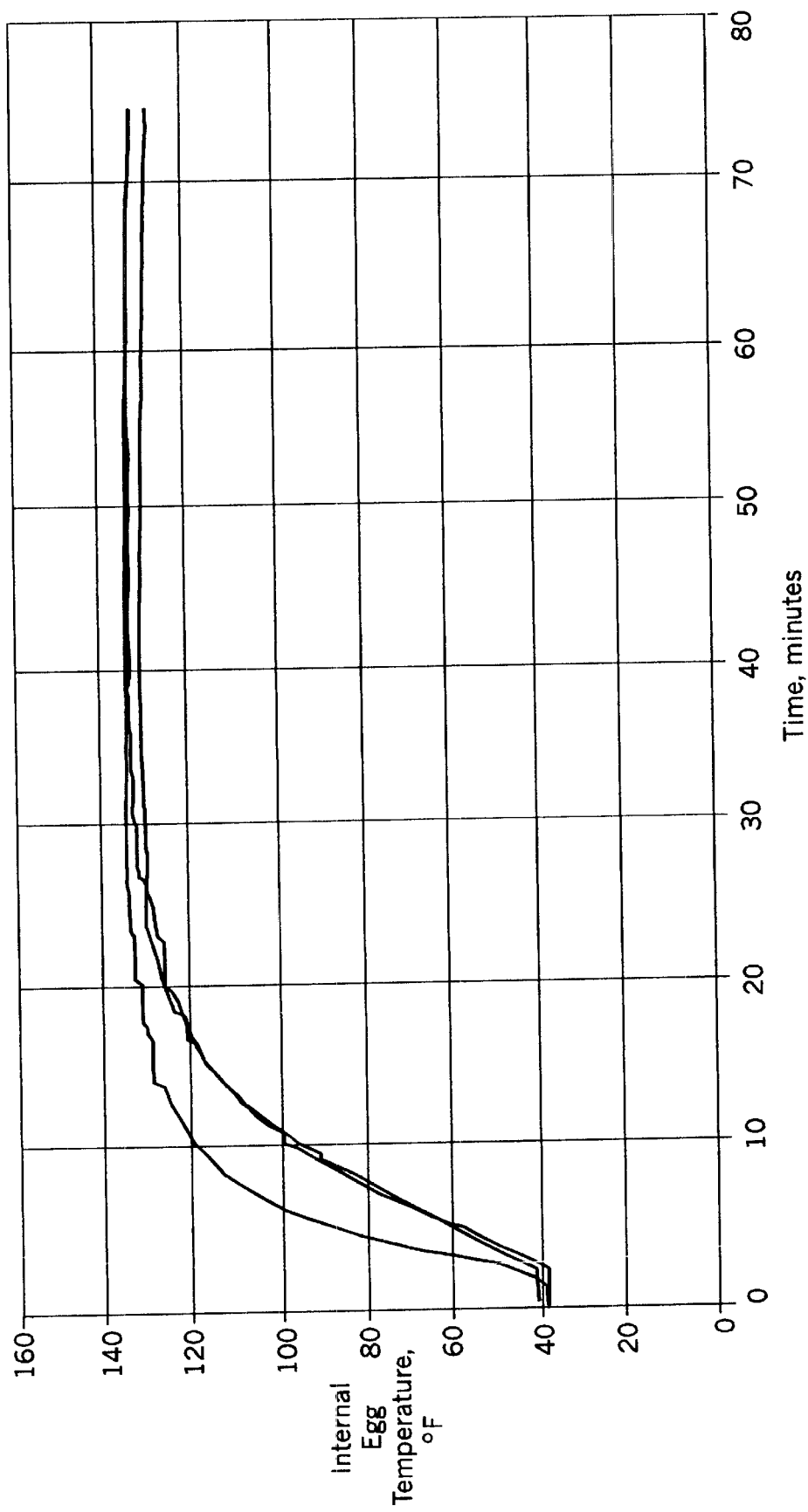
FIG. 20 is a graphical representation of the internal egg temperature for shell eggs heated in humidified air. The dry bulb temperature was set at 137° F. (58.3° C.) and the wet bulb temperature was set at 135° F.. Air flow was 262 ft/min. Eggs were heated in a single tier.
Figure 21:
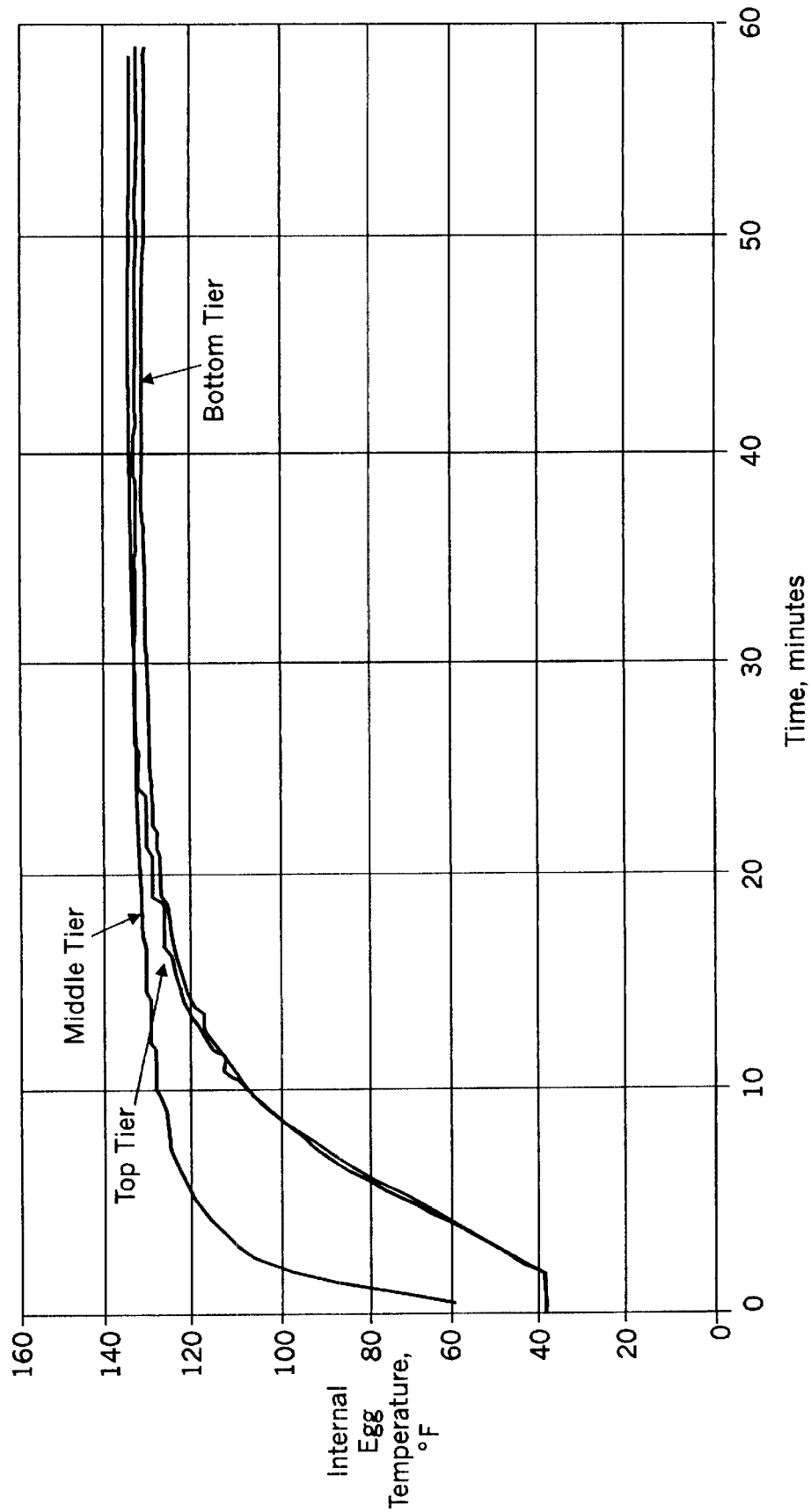
FIG. 21 is a graphical representation of the internal egg temperature for shell eggs heated in humidified air. The dry bulb temperature was set at 137° F. (58.3° C.) and the wet bulb temperature was set at 135° F. (57.2° C.). Air flow was 315 ft/min. Eggs were heated in three tiers.
Figure 22:
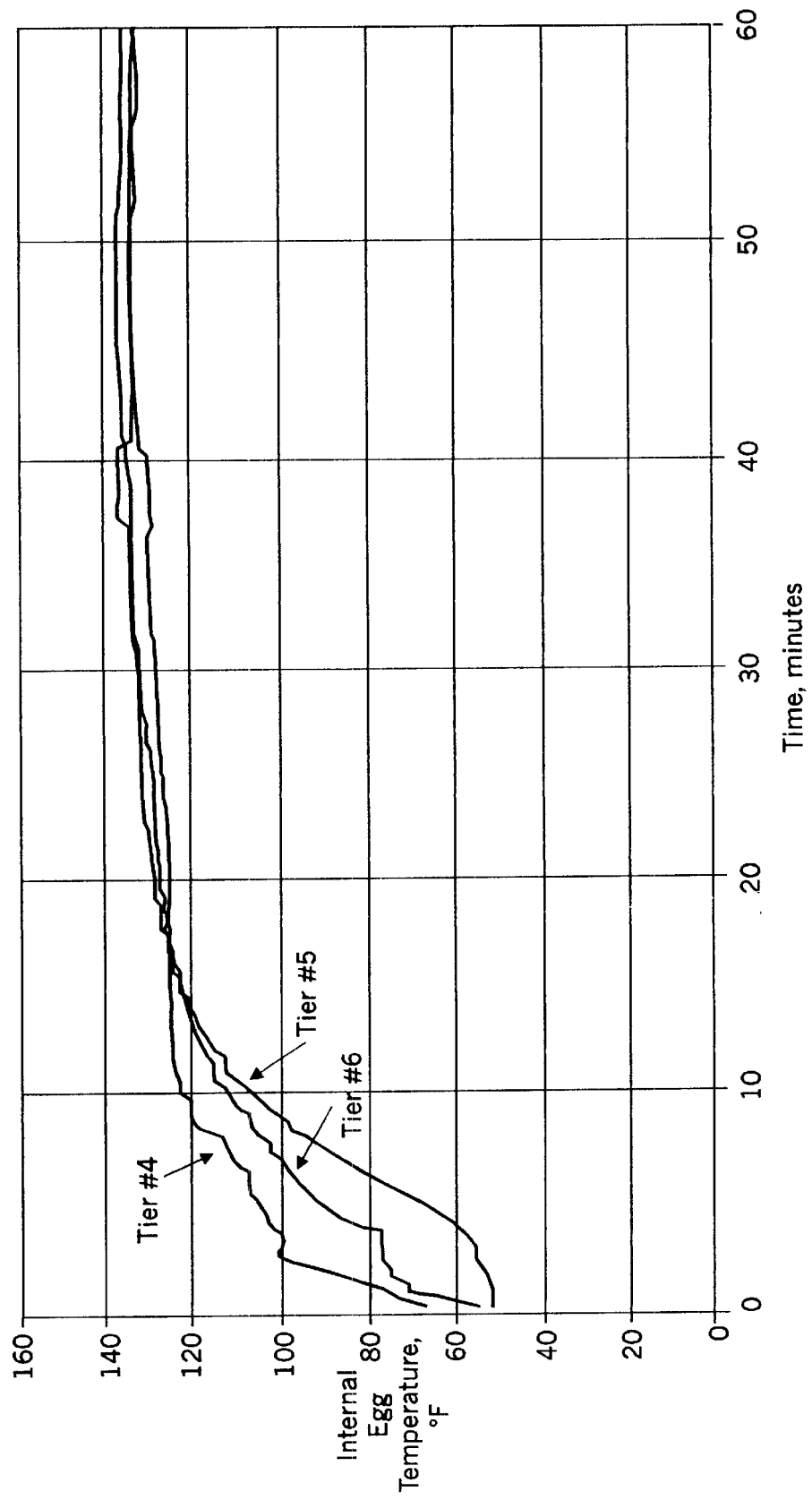
FIG. 22 is a graphical representation of the internal egg temperature for shell eggs heated in humidified air. The dry bulb temperature was set at 137° F. (58.3° C.) and the wet bulb temperature was set at 135° F. (57.2° C.). Air flow was 350 ft/min. Eggs were heated in six tiers.
Figure 24B:
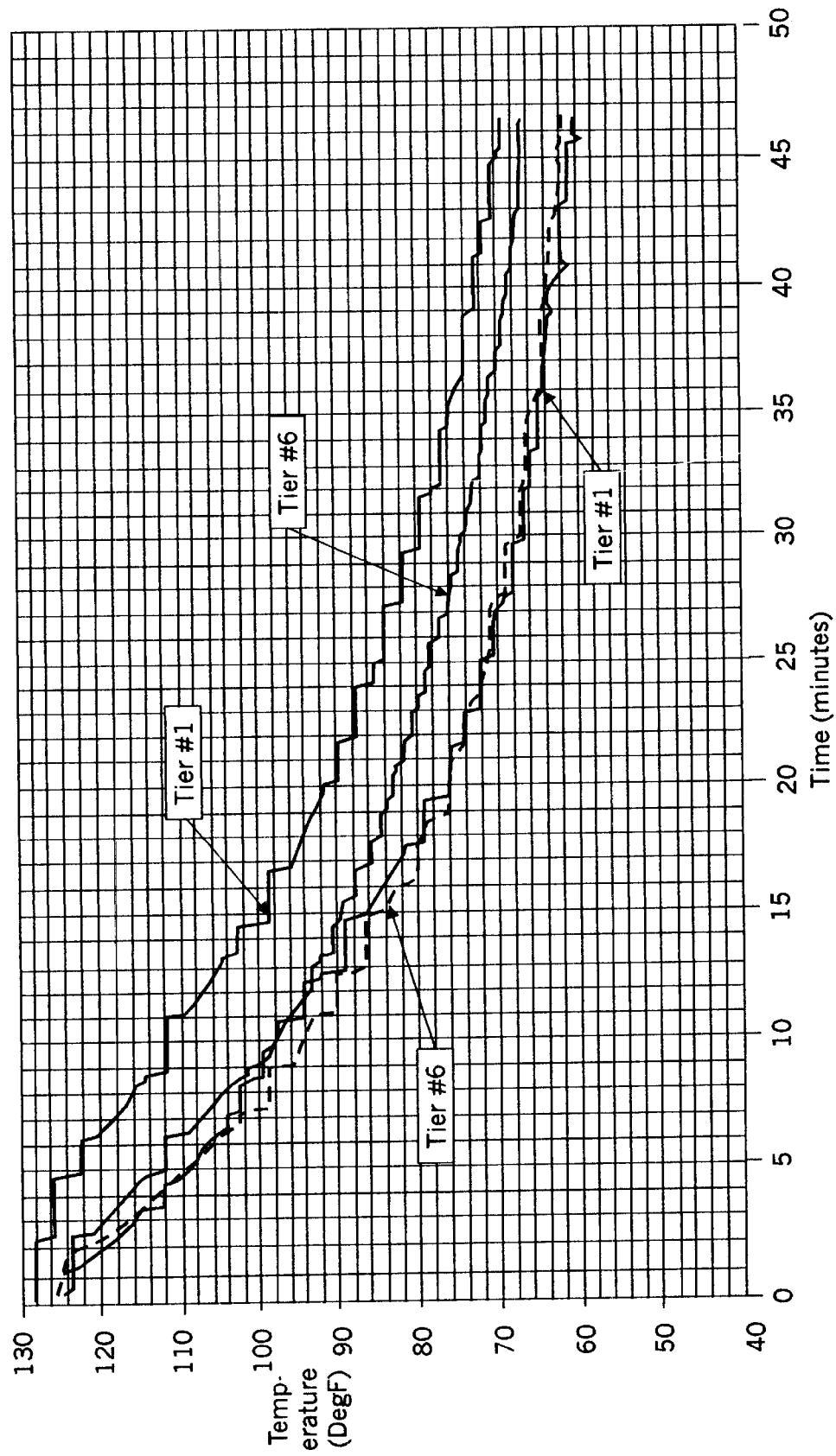
FIG. 24B is a graphical representation of the internal egg temperature for shell eggs cooled in humidified air. The eggs were cooled to ambient temperature in refrigerated air at 55° F. (12.8° C.) with an air flow of 300 ft/min. Eggs were treated in a six tier configuration.
Figure 25A:
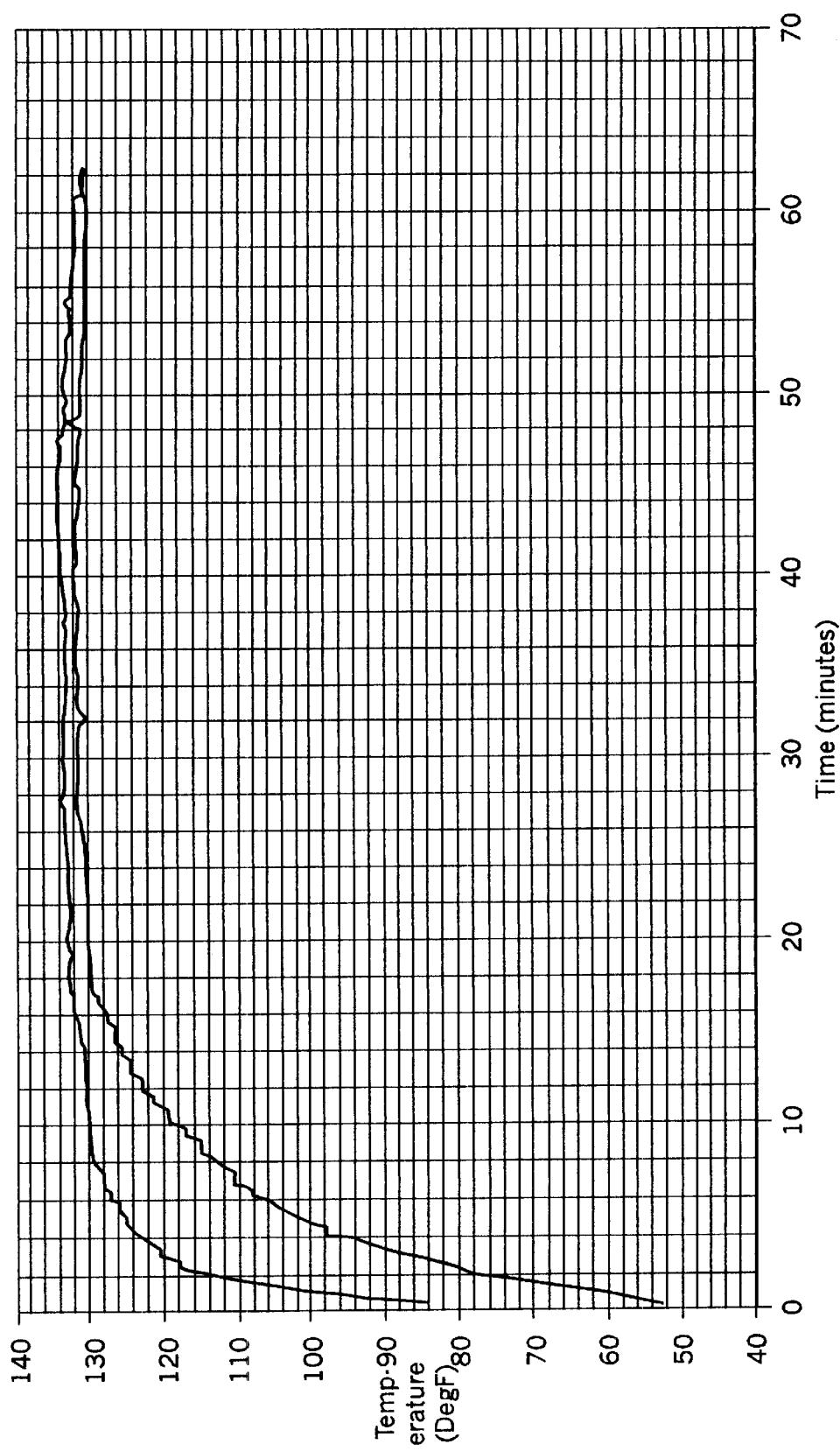
FIG. 25A is a graphical representation of the internal egg temperature for shell eggs heated in humidified air. The dry bulb temperature was set at 137° F. (58.3° C.) and the wet bulb temperature was set at 135° F. (57.2° C.) for the heating and hold periods. Air flow was 350 ft/min. Eggs were heated in six tiers.
Figure 25B:
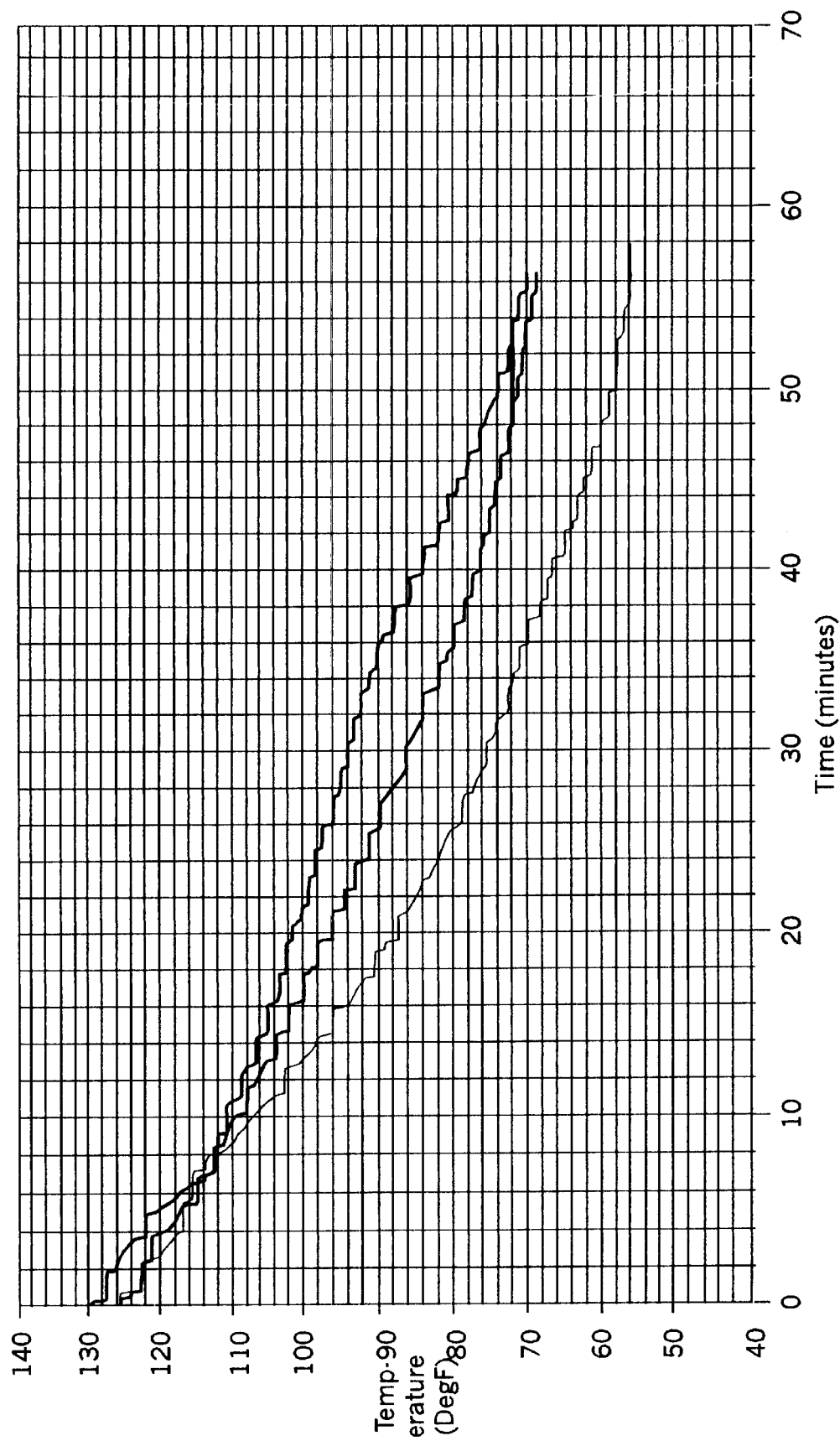
FIG. 25B is a graphical representation of the internal temperature for shell eggs cooled in refrigerated air. The eggs were cooled to ambient temperature in humidified air at 47° F. (8.3° C.) with an air flow of 300 ft/min. Eggs were treated in a six tier configuration.
Figure 26A:
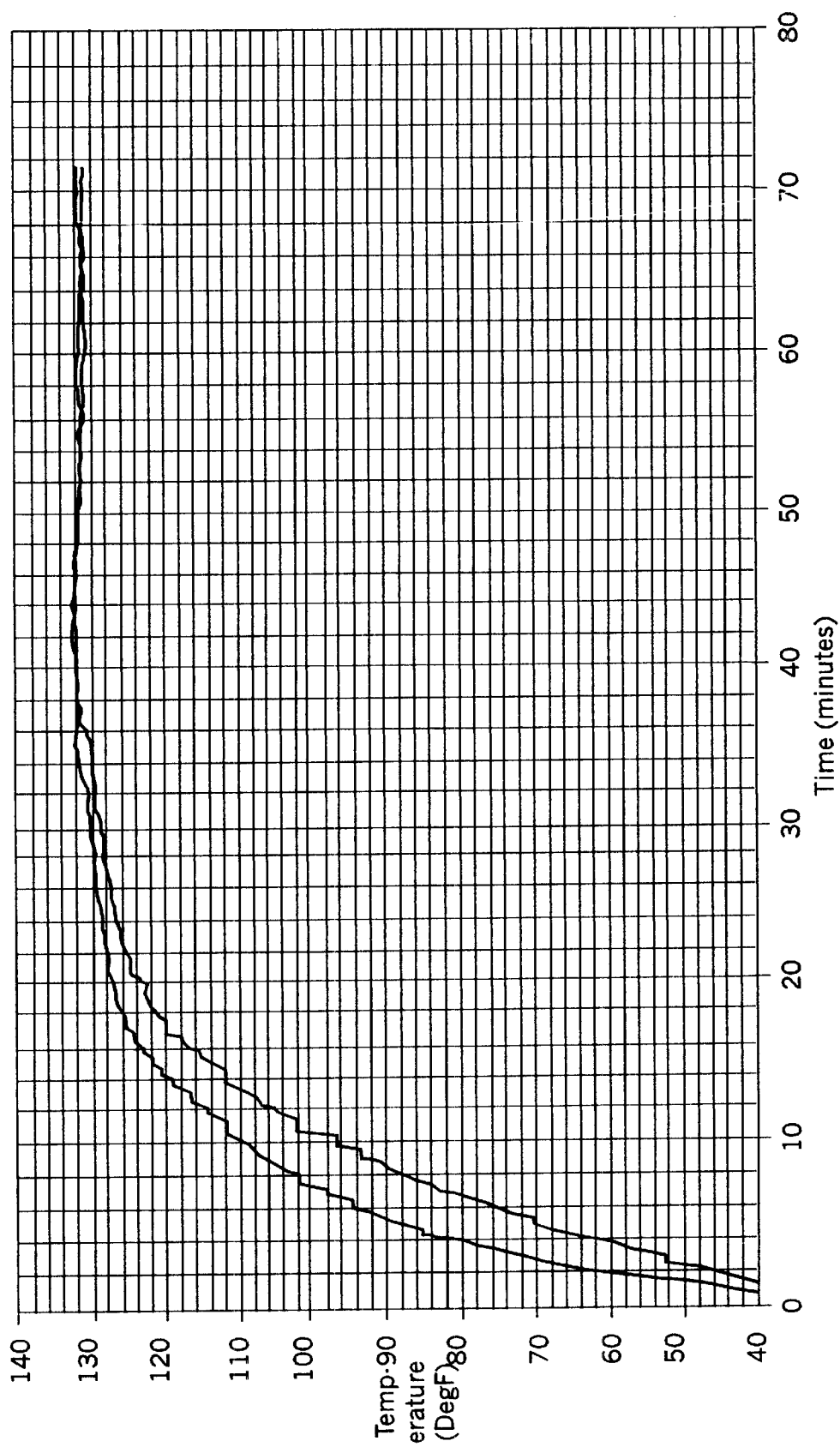
FIG. 26A is a graphical representation of the internal egg temperature for shell eggs heated in humidified air. The dry bulb temperature was set at 137° F. (58.3° C.) and the wet bulb temperature was set at 135° F. (57.2° C.) for the heating and hold periods. Air flow was 350 ft/min. Eggs were heated in six tiers.
Figure 26B:
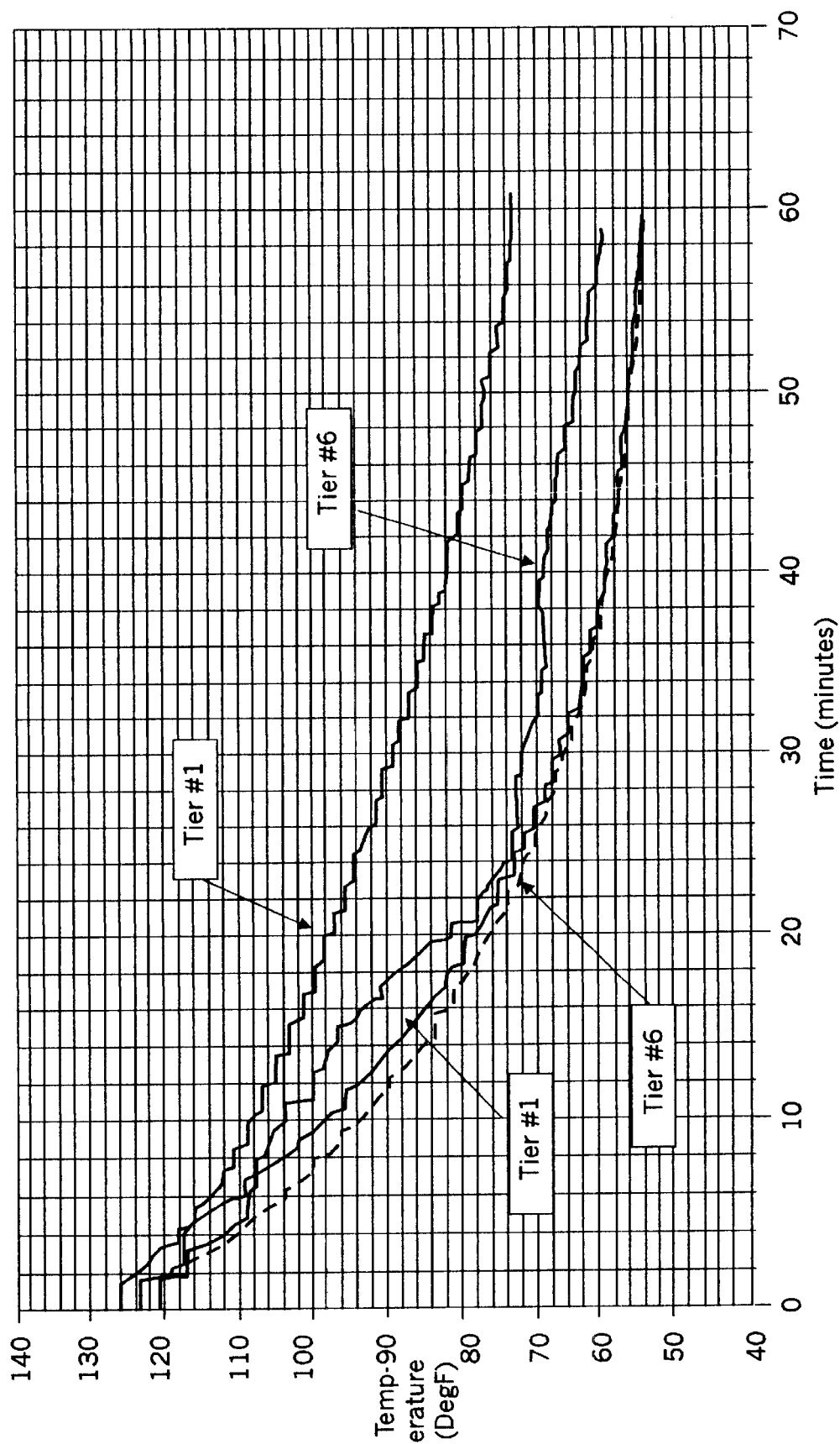
FIG. 26B is a graphical representation of the internal temperature for shell eggs cooled in humidified air. The eggs were cooled to ambient temperature in refrigerated air at 55° F. (12.8° C.) with an air flow of 400 ft/min. Eggs were treated in a six tier configuration.
Figure 27A:
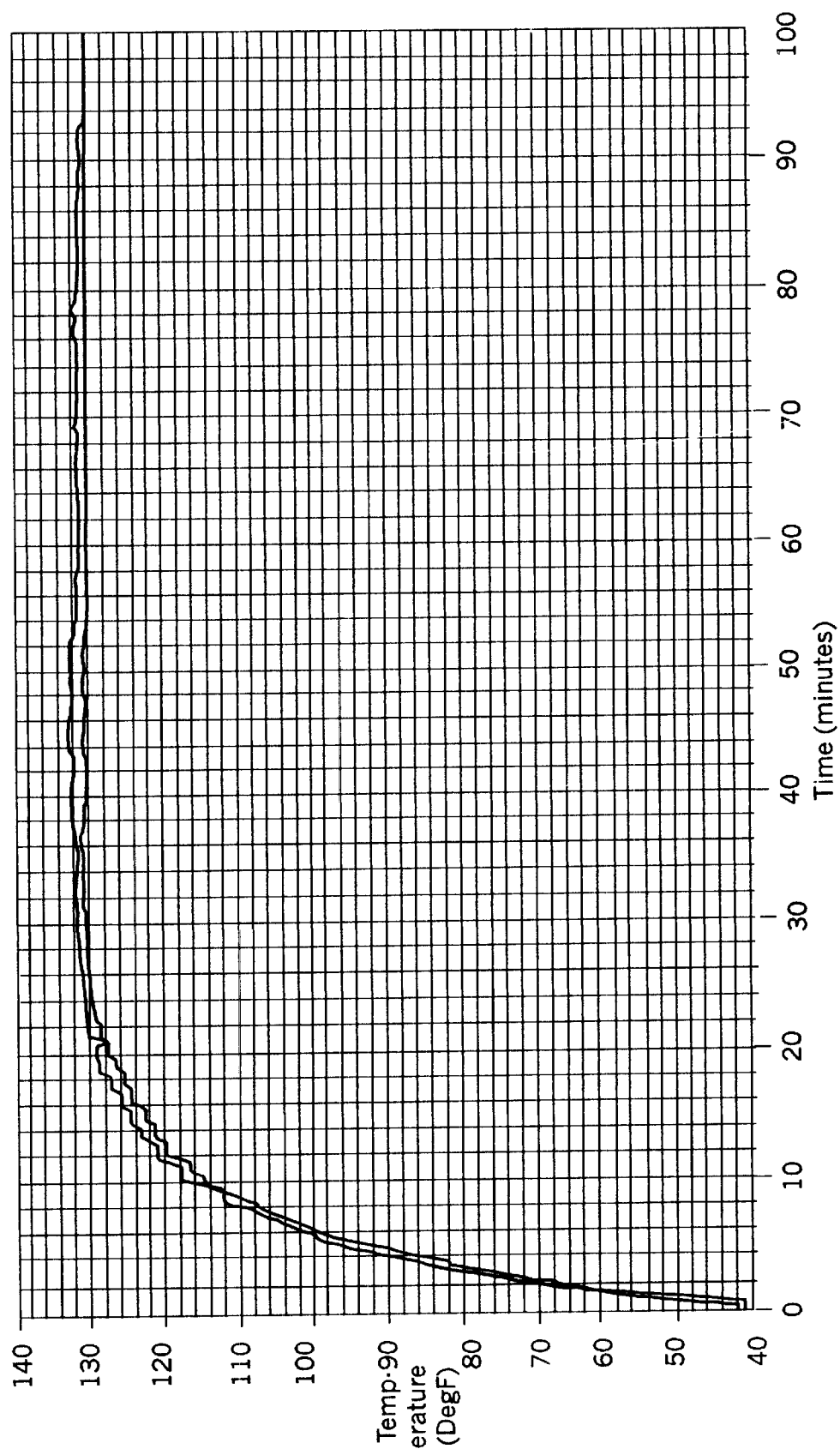
FIG. 27A is a graphical representation of the internal egg temperature for shell eggs heated in humidified air. The dry bulb temperature was set at 137° F. (58.3° C.) and the wet bulb temperature was set at 135° F. (57.2° C.) for the heating and hold periods. Air flow was 350 ft/min. Eggs were heated in six tiers.
Figure 27B:
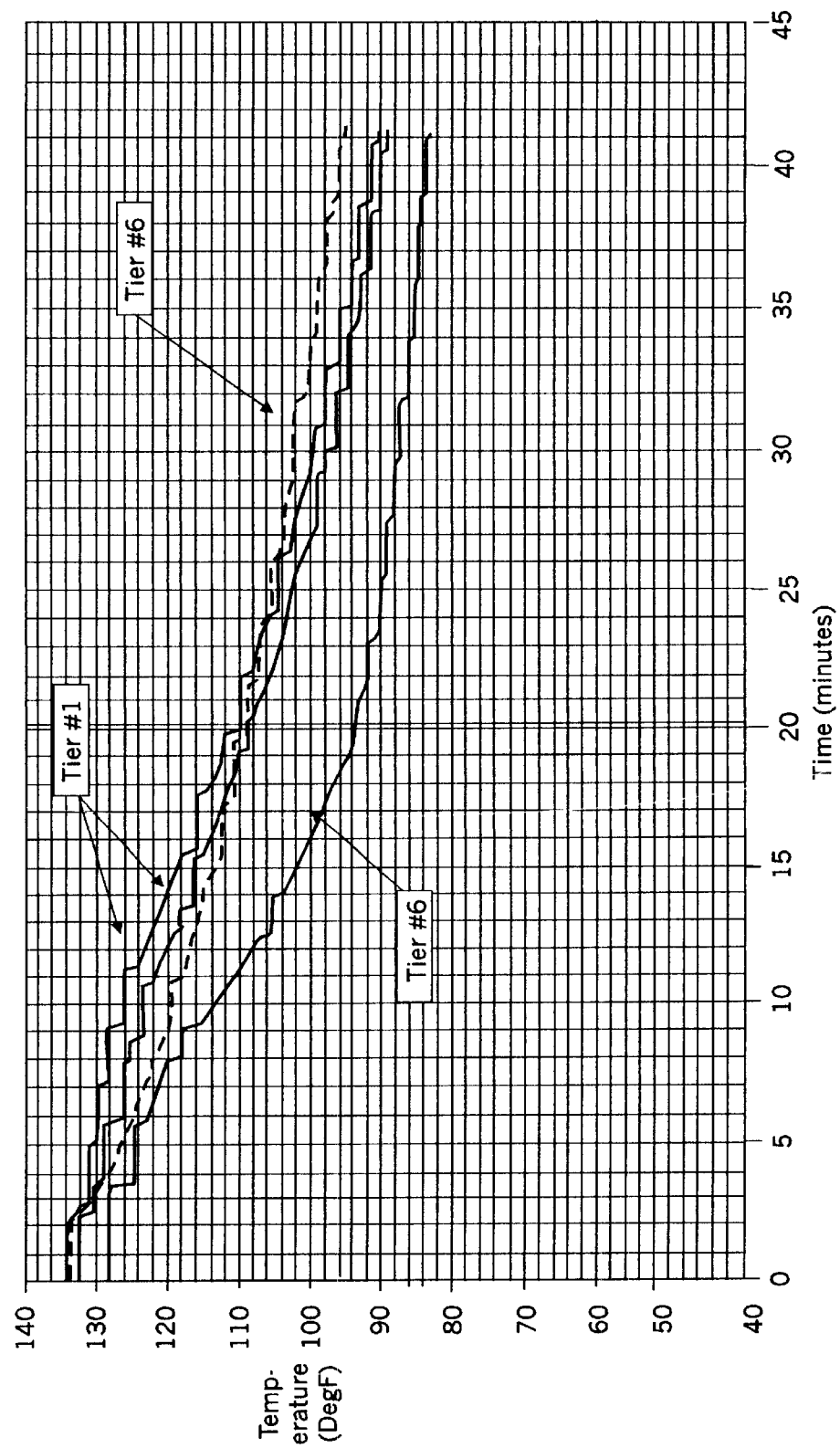
FIG. 27B is a graphical representation of the internal temperature for shell eggs cooled in ambient air (76° F./24.4° C.) with an air flow of 300 ft/min. Eggs were treated in a six tier configuration.

Microbial populations were converted to $\log_{10}$ values for each sampling time (Table 4). Individual survivor curves were then generated for each egg heating trial (representative survivor curve shown in FIG. 9). D-values for the inoculum pool were calculated as the negative reciprocal of the slope of the survivor curve obtained by linear regression analysis (slope only includes those populations determined after the eggs had reached the target heating temperature). The D-values for Trials 1 and 2 were 5.49 ($r^2=0.98$) and 6.12 ($r^2=0.98$). These results were consistent with the D-value data reported by Schuman et al., (1997) *J. Applied Microbiology* 83:438, for intact shell eggs pasteurized using a water immersion process. Schuman et al. reported a mean D-value of 6.0 minutes for *Salmonella enteritidis* inoculated into the center of shell eggs heated by immersion in a 57° C. (134.5° F.) circulating water bath.

Conclusion

The heat resistance of six strains of *Salmonella* (including serotypes Enteritidis, Heidelberg, and Typhimurium) in liquid whole egg (LWE) and shell eggs was determined. Decimal reduction times (D-values) of each of the six strains were determined in LWE heated at 56.7° C. within glass capillary tubes immersed in a water bath. D-values ranged between 3.05 to 4.09 minutes, and some significant differences were observed between the strains tested (alpha= 0.05). In addition, approximately 7 $\log_{10}$ cfu/g of a six strain cocktail were inoculated into the geometric center of raw shell eggs and the eggs heated at 57.2° C. using convection currents of humidity controlled air. D-values of the salmonellae ranged from 5.49 to 6.12 minutes within the center of intact shell eggs. A heating period of 70 minutes or more resulted in no surviving salmonellae being detected.

The results demonstrate that the inactivation rates of *Salmonella*, including serotypes Enteritidis (including phage type 4), Heidelberg, and Typhimurium DT104 in shell eggs are essentially the same, regardless of whether the heating mode involves water immersion or the use of convection currents of humidity-controlled air.

TABLE 2

Salmonella spp. D-values at 56.67° C.

| Bacteria | Correlation Coefficient | | D-Value | | Mean D-value[1] |
|---|---|---|---|---|---|
| | Trial 1 | Trial 2 | Trial 1 | Trial 2 | |
| *S. enteritidis* Benson-1 | 0.99 | 0.98 | 3.41 | 3.48 | 3.44a |
| *S. enteritidis* ME-14 | 0.99 | 0.99 | 3.96 | 4.23 | 4.10ab |
| *S. enteritidis* ME-18 | 0.99 | 0.97 | 3.66 | 3.97 | 3.81bc |
| *S. heidelberg* UN-L | 0.99 | 0.99 | 3.11 | 3.01 | 3.06d |
| *S. enteritidis* H3353 | 0.97 | 0.98 | 2.92 | 3.4 | 3.16bc |
| *S. typhimurium* DT104 | 0.99 | 0.98 | 3.31 | 2.95 | 3.13e |

[1]Values in columns not followed by the same letter are significantly different ($p \leq 0.05$).

TABLE 3

LWE Analyticals

| | pH | | Total Solids | |
|---|---|---|---|---|
| Bacteria | Trial 1 | Trial 2 | Trial 1 | Trial 2 |
| S. enteritidis Benson-1 | 7.07 | 7.07 | 23.63 | 23.63 |
| S. enteritidis ME-14 | 7.40 | 7.40 | 23.95 | 23.97 |
| S. enteritidis ME-18 | 7.40 | 7.40 | 23.95 | 23.97 |
| S. heidelberg UN-L | 7.40 | 7.40 | 23.95 | 23.97 |
| S. enteritidis H3353 | 7.40 | 7.40 | 23.95 | 23.97 |
| S. typhimurium DT104 | 7.07 | 7.07 | 23.63 | 23.63 |

TABLE 4

Thermal Inactivation of Salmonella spp. in Shell Egg Subjected to Low-Temperature, Long-Time Heating at 57.2° C. in a Humidity-Controlled Convection Heating System

| Dwell Time | Internal Temp.[1] (° C.) | | Survivors (log cfu g$^{-1}$) | | Viable Salmonella present[2] | |
|---|---|---|---|---|---|---|
| | Trial 1 | Trial 2 | Trial 1 | Trial 2 | Trial 1 | Trial 2 |
| 0 | 23.25 | 22.94 | 6.98 | 7.01 | 3/3 | 3/3 |
| 30 | 56.12 | 56.18 | 6.13 | 6.21 | 3/3 | 3/3 |
| 40 | 56.65 | 56.62 | 5.11 | 5.05 | 3/3 | 3/3 |
| 50 | 57.05 | 56.82 | 2.82 | 3.43 | 3/3 | 3/3 |
| 60 | 56.85 | 56.76 | 0.82 | 1.3 | 1/3 | 3/3 |
| 70 | 56.98 | 56.98 | <1.0 | <1.0 | 0/3 | 0/3 |
| 80 | 56.98 | 56.88 | <1.0 | <1.0 | 0/3 | 0/3 |

[1]The internal temperature for trial 2 is the average of 5 eggs. Egg #6 was omitted because the thermocouple was pulled out at the beginning of the heating cycle.
[2]Samples positive by enrichment/samples tested.

EXAMPLE 3

A series of studies were undertaken to evaluate both the heating and cooling of in-shell eggs using humidified air in a commercial test unit. These studies report internal temperatures of shell eggs heated at 137, 138 and 140° F. (58.3, 58.9, and 60° C.), at different air flow rates, with and without added steam, and with different physical arrangements of eggs in the heating chamber. The results are summarized in Table 5 and representative internal egg temperature profiles are shown at FIGS. 10–27.

Grade A Large Eggs were purchased from Sam's Club for testing at the Proctor & Schwartz drying laboratory in Horsham, Pa. A series of 18 tests were performed. A single conveyor through circulation was simulated in all cases. Temperatures were recorded using a Rustrak Ranger Data Logger with hypodermic thermocouples placed in the center of the egg so that yolk temperatures could be obtained. Humidified air, when applied, was at 95% or greater relative humidity. The entering air direction was in the downward direction for all tests.

In Test #1, 30 eggs were weighed and placed into an egg crate. Three hypodermic thermocouples were placed in the center of the eggs and secured with caulking. The eggs were placed in a Proctor & Schwartz JD-2-thru circulation oven/dryer. Entering air temperatures of 140° F. (60° C.) dry bulb and 138° F. (58.9° C.) wet bulb were chosen with all down air flow. The wet bulb temperature was maintained by adding live steam into the dryer. The test was run until all three thermocouples reached 133° F. (56.1° C.), and then the eggs were held for an additional 30 minutes. An air velocity of 175 ft/min, which resulted in a 30 minute heat up time and a 30 minute hold time. The whites of the eggs appeared somewhat cloudy, and the yolks seemed flatter than the fresh eggs.

Tests #2 and #3 were run as repeats of Test #1, except that the air velocity was increased in Test #2 to 253 ft/min and in Test #3 to 322 ft/min.

For Test #4, it was decided to run with the entering air temperature at 140° F. (60° C.), but not to add any steam. The heat-up time almost doubled (from 30 minutes to 52 minutes) and the test was stopped without carrying out the 30 minute holding time.

Test #5 was run using two tiers of eggs (60 eggs total). The same temperatures were run as in the previous test (dry bulb=140° F.; wet bulb=138° F.), but higher air velocities were measured. It was later determined that for Tests #5 through #8, the egg crates were flipped upside down, which caused the high air velocities. The two-tier egg tests were successful with the heat up time measured at 41 minutes and the final eggs had a good appearance.

Test #6 was run using three tiers of eggs and the same conditions as for Test #5. The heat up time was determined to be 44.33 minutes, and the final product was deemed as equal to the previous tests.

Test #7 was run as a repeat of Test #1, but with an air velocity of 615 ft/min.

Test #8 was run using the same heat up conditions as above, but without adding any steam during the 30 minute holding period. The internal temperature of the eggs fell to below 125° F. during the holding period, which was deemed unacceptable for a commercial pasteurization process.

After the first 8 tests, it was concluded that steam was desirable during both the heat up and holding phases to achieve a commercially feasible (e.g., efficient and efficacious) process. In addition, it was concluded that this method is compatible with multi-layers of eggs.

Tests #9 through #13 were duplicates of some of the previous testwork using only 1 tier of eggs. The placement and mounting of the thermocouples were modified. The thermocouples were hung from the top perforated plate with wire ties and places through the top of the eggs. Temperatures of 140° F. wet bulb/138° F. dry bulb (60° C./58.9° C.) and 137° F. wet bulb/135° F. dry bulb (58.3° C./57.2° C.) were used in Tests #9–10 and Tests #11–13, respectively. The heat up times ranged from 24.67 to 119.33 minutes depending upon the final desired temperature to either 133° F. (56.1° C.) or 135° F. (57.2° C.). In all cases, the whites of the eggs looked clear on a paper plate and slightly cloudy on a black tray.

Test #12 was run as a repeat of Test #6 using three tiers of eggs. The heat up time was determined to be 28.67 minutes. The eggs were then held for an additional 30 minutes at the target temperature. One thermocouple was placed in each tier and recorded.

Test #13 was run with 6 tiers with the probes placed in the bottom three trays. The heat up time was determined to be 39.33 minutes. Initially, there was a temperature gradient through the tiers; however, this difference quickly decreased and all three probes read similar temperatures after 18 minutes of heating.

Test #14 was a repeat of Test #13 with 6 tiers of eggs, except that the probes were clamped and brought in though the side of each egg crate and into the sides of each egg.

Tests #15 through #18 investigated both heating and cooling of the eggs. In all of the tests, the eggs were heated with an entering air temperature of 137° F. dry bulb and 135° F. wet bulb was used with 6 tiers of eggs.

In test #15, the eggs were cooled using a suction box cooler and 55° F. (12.8° C.) air temperature and a velocity of 300 ft/min. Four probes were placed into the eggs, two on the top tier and two on the bottom tier.

Test #15 was run using 47° F. (8.3° C.) and an air velocity of 300 ft/min.

For Test #17, the air velocity was increased to 400 ft/min.

For Test #18, only ambient air (76° F./24.4° C.) was used.

The cooling times for Tests #15 through $18 varied from 41 to 60.67 minutes.

Plots were made for each of the test conditions and are shown at FIGS. 10–27. The data described above are summarized below in Table 5.

TABLE 5

Summary of Results of Tests #1–18

| | Test # | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| Test Time (min) | 60 | 64.67 | 70.67 | 52 | 71 | 74.33 | 72.67 | 76 | 149.33 | 54.67 | 74.67 | 58.67 | 69.33 | 69.67 | 64.67 | 62.33 | 71 | 92.33 |
| Entering Air Velocity (FPM) | 175 | 253 | 322 | 322 | 543 | 414 | 615 | 615 | 262 | 262 | 262 | 315 | 350 | 350 | 350 | 350 | 3650 | 350 |
| # of Tiers | 1 | 1 | 1 | 1 | 2 | 3 | 1 | 1 | 1 | 1 | 1 | 3 | 6 | 6 | 6 | 6 | 6 | 6 |
| Dry Bulb Temp. (° F.) | 140 | 140 | 140 | 140 | 140 | 140 | 140 | 140–145 | 140 | 140 | 137 | 137 | 137 | 137 | 137 | 137 | 137 | 137 |
| Wet Bulb Temp. (° F.) | 138 | 138 | 138 | No Steam | 138 | 138 | 138 | 138/No Steam | 138 | 138 | 135 | 135 | 135 | 135 | 135 | 135 | 135 | 135 |
| Cooling Temp. | — | — | — | — | — | — | — | — | — | — | — | — | — | — | 55 | 47 | 55 | 76 |
| Cooling Time (min.) | — | — | — | — | — | — | — | — | — | — | — | — | — | — | 46.33 | 56.83 | 60.67 | 41 |
| Cooling Air Velocity (FPM) | — | — | — | — | — | — | — | — | — | — | — | — | — | — | 300 | 300 | 400 | 300 |

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

That which is claimed:

1. A method of reducing a microbial population in a food product, comprising:
   pre-heating an avian shell egg to a target temperature using humidified air at greater than about 90% relative humidity; and then
   heating the avian shell egg in humidified air at greater than about 90% relative humidity to provide to the shell egg a thermal treatment sufficient to reduce Salmonella spp. in the shell egg,
   wherein the humidified air during said pre-heating and heating steps is circulating at a flow rate of between about 150 to 750 feet per minute,
   and further wherein the thermal treatment does not result in visible coagulation of contents contained in the shell egg and the thermal treatment does not result in substantially impairing the functionality of contents contained in the shell egg.

2. The method of claim 1, wherein the thermal treatment includes a period of time to bring the contents of the shell egg to a target temperature for destroying Salmonella spp.

3. The method of claim 1, wherein the thermal treatment applied to the shell egg is sufficient to result in at least about a 5-log reduction in Salmonella spp. in the albumen of the shell egg.

4. The method of claim 1, wherein the thermal treatment applied to the shell egg is sufficient to result in at least about a 5-log reduction in Salmonella spp. in the yolk of the shell egg.

5. The method of claim 1, wherein the shell egg is heated for 35 to 90 minutes.

6. The method of claim 1, wherein the yolk of the shell egg is held at a target temperature for destruction of Salmonella spp. for about 12 to 125 minutes.

7. The method of claim 1, wherein the yolk of the shell egg is held at a target temperature for destruction of Salmonella spp. for about 12 to 45 minutes.

8. The method of claim 7, wherein the yolk of the shell egg is held between about 55° C. to about 59° C.

9. The method of claim 1, wherein the yolk of the shell egg is held between about 56° C. to about 58° C. for about 15 to 35 minutes.

10. The method of claim 1, wherein the yolk of the shell egg is held between about 56° C. to about 57° C. for about 25 to 35 minutes.

11. The method of claim 1, wherein the humidified air is humidified at greater than about 95% relative humidity.

12. The method of claim 1, wherein the relative humidity of the humidified air is below dew point temperature.

13. The method of claim 1, wherein the avian shell egg is selected from the group consisting of chicken, turkey, duck, goose, quail, and pheasant shell eggs.

14. The method of claim 1, wherein the avian shell egg is a chicken shell egg.

15. The method of claim 1, wherein the Salmonella spp. includes *Salmonella enteritidis*.

16. The method of claim 1, further comprising the step of cooling the heated shell egg.

17. The method of claim 1, wherein the treated shell egg has an extended refrigerated shelf life of at least about four weeks.

18. The method of claim 1, further comprising the step of coating the shell egg with a wax or an oil.

19. The method of claim 1, wherein the shell egg is moved, agitated or rotated during heating.

20. A method of reducing a microbial population in a food product, comprising:

pre-heating an avian shell egg to a target temperature between about 50.6° C. to 61.1° C. using humidified air at greater than about 90% relative humidity; and then heating the shell egg in humidified air at greater than about 90% relative humidity, wherein the yolk of the shell egg is held between about 52–59° C. for a time sufficient to produce at least about a 5-log reduction in Salmonella spp. in the yolk of the shell egg;

wherein the humidified air during said pre-heating and heating steps is circulating at a flow rate of between about 150 to 750 feet per minute, and further wherein the thermal treatment does not result in significant coagulation of contents contained in the shell egg and the thermal treatment does not result in substantially impairing the functionality of contents contained in the shell egg.

21. The method of claim 20, wherein the at least about a 5-log reduction in Salmonella spp. is calculated by combining reductions in Salmonella spp. achieved during the pre-heating period and a hold period.

22. A method of reducing a microbial population in a food product, comprising:

pre-heating a chicken shell egg to a target temperature between about 50.6° C. to 61.1° C. using humidified air at greater than about 90% relative humidity; and then heating the chicken shell egg in humidified air at greater than about 90% relative humidity to provide to the shell egg a thermal treatment sufficient to achieve at least about a 5-log reduction in *Salmonella enteritidis* in the shell egg, wherein the humidified air during said pre-heating and heating steps is circulating at a flow rate of between about 200 to 500 feet per minute, and further wherein the thermal treatment does not result in significant coagulation of contents contained in the shell egg and the thermal treatment does not result in substantially impairing the functionality of contents contained in the shell egg.

23. The method according to claim 1, wherein said pre-heating target temperature is between about 50.6° C. to 61.1° C.

24. A method of reducing a microbial population in a food product, comprising:

pre-heating an avian shell egg to a target temperature using humidified air at greater than about 90% relative humidity;

heating the avian shell egg in humidified air at greater than about 90% relative humidity to provide to the shell egg a thermal treatment sufficient to reduce Salmonella spp. in the shell egg; and then cooling the avian shell egg in humidified air at greater than about 90% relative humidity;

wherein the humidified air during said pre-heating, heating and cooling steps is circulating at a flow rate of between about 150 to 750 feet per minute, and further wherein the thermal treatment does not result in visible coagulation of contents contained in the shell egg and the thermal treatment does not result in substantially impairing the functionality of contents contained in the shell egg.

25. A method of reducing a microbial population in a food product, comprising:

pre-heating the avian shell egg to a target temperature using humidified air at greater than about 90% relative humidity, and then heating the avian shell egg in humidified air at greater than about 90% relative humidity to provide to the shell egg a thermal treatment sufficient to reduce Salmonella spp. in the shell egg;

wherein the humidified air in said pre-heating and heating steps is circulating at a flow rate of between about 150 to 750 feet per minute;

wherein said pre-heating and heating steps do not result in water beading on the exterior surface of the shell egg;

and further wherein the thermal treatment does not result in visible coagulation of contents contained in the shell egg and the thermal treatment does not result in substantially impairing the functionality of contents contained in the shell egg.

26. A method of reducing a microbial population in a food product, comprising:

providing a plurality of avian shell eggs within a plurality of egg containers;

arranging the plurality of egg containers in a vertically stacked arrangement;

pre-heating the plurality of avian shell eggs to a target temperature using humidified air at greater than about 90% relative humidity; and then heating the plurality of avian shell eggs in humidified air at greater than about 90% relative humidity to provide to the shell egg a thermal treatment sufficient to reduce Salmonella spp. in the shell egg, wherein the humidified air during said pre-heating and heating steps is circulating at a flow rate of between about 150 to 750 feet per minute, and further wherein the thermal treatment does not result in visible coagulation of contents contained in the plurality of shell eggs and the thermal treatment does not result in substantially impairing the functionality of contents contained in the plurality of shell eggs.

27. The method of claim 26, wherein the plurality of egg containers comprises two to six egg containers.

* * * * *